US012795621B2

(12) United States Patent
Cui et al.

(10) Patent No.: US 12,795,621 B2
(45) Date of Patent: Nov. 10, 2026

(54) TECHNIQUES FOR MANAGING TIMING ADVANCE REPORT

(71) Applicant: ZTE Corporation, Shenzhen (CN)

(72) Inventors: Fangyu Cui, Shenzhen (CN); Jianqiang Dai, Shenzhen (CN); Nan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 305 days.

(21) Appl. No.: 18/601,695

(22) Filed: Mar. 11, 2024

(65) Prior Publication Data

US 2024/0215001 A1 Jun. 27, 2024

Related U.S. Application Data

(63) Continuation of application No. PCT/CN2021/121147, filed on Nov. 28, 2021.

(51) Int. Cl.
*H04W 72/0446* (2023.01)
*H04L 5/00* (2006.01)

(52) U.S. Cl.
CPC ....... *H04W 72/0446* (2013.01); *H04L 5/0053* (2013.01)

(58) Field of Classification Search
None
See application file for complete search history.

(56) References Cited

U.S. PATENT DOCUMENTS 10,505,624 B2 12/2019 Fourtet et al.
12,556,898 B2 2/2026 Nader et al.
2007/0149206 A1 6/2007 Wang et al.
2017/0019928 A1 1/2017 Viraraghavan
2018/0160440 A1 6/2018 Hosseini
2018/0242268 A1 8/2018 Rune et al.
2019/0342845 A1 11/2019 Laselva et al.
2019/0394738 A1 12/2019 Abedini et al.
2020/0107348 A1 4/2020 Park et al.
2021/0058884 A1 2/2021 Liu et al.
2021/0251012 A1 8/2021 Shrestha et al.
(Continued)

FOREIGN PATENT DOCUMENTS

CN 111836398 A 10/2020
CN 112040559 A 12/2020
(Continued)

OTHER PUBLICATIONS

Moderator (Mediatek), "Summary #6 of A1 8.15.1 Enhancements to time and frequency synchronization," 3GPP TSG RAN WG1 Meeting #106-e, R1-2108558, e-Meeting, Aug. 16-27, 2021 (78 pages).
(Continued)

*Primary Examiner* — Steve R Young
(74) *Attorney, Agent, or Firm* — Ashurst Perkins Coie US LLP

(57) ABSTRACT

Techniques are described for determining when to transmit and/or the content to include in a timing advance (TA) report. An example wireless communication method includes transmitting, by a communication device, at least one timing advance value associated with a time period, where the at least one timing advance value is transmitted based on a trigger condition, and where the time period corresponds to a transmission duration of a message for a shared channel or a random access channel.

18 Claims, 24 Drawing Sheets

(56) References Cited

U.S. PATENT DOCUMENTS

| | | | | |
|---|---|---|---|---|
| 2021/0345281 | A1 | 11/2021 | Yang et al. | |
| 2022/0070810 | A1 * | 3/2022 | Bi | H04W 56/0015 |
| 2022/0159706 | A1 | 5/2022 | Panteleev et al. | |
| 2022/0330187 | A1 * | 10/2022 | Cheng | H04W 56/004 |
| 2023/0217397 | A1 * | 7/2023 | Zhou | H04W 56/0045 370/503 |
| 2023/0224843 | A1 * | 7/2023 | Wang | H04W 56/0015 370/503 |
| 2023/0413204 | A1 * | 12/2023 | Babaei | H04W 56/0045 |
| 2024/0292420 | A1 * | 8/2024 | Fang | H04W 56/0045 |
| 2024/0314724 | A1 * | 9/2024 | Manolakos | H04W 64/00 |
| 2024/0322946 | A1 | 9/2024 | Yan et al. | |
| 2025/0048291 | A1 * | 2/2025 | Shin | H04W 56/0045 |
| 2026/0025775 | A1 * | 1/2026 | Sun | H04W 56/0045 |

FOREIGN PATENT DOCUMENTS

| | | | |
|---|---|---|---|
| CN | 112260805 | A | 1/2021 |
| CN | 113261351 | | 8/2021 |
| CN | 11316348 | | 12/2022 |
| WO | 2016/163843 | A1 | 10/2016 |
| WO | 2018/052355 | A1 | 3/2018 |
| WO | 2019029372 | A1 | 2/2019 |
| WO | 2019/214380 | A1 | 11/2019 |
| WO | 2020/034574 | A1 | 2/2020 |
| WO | 2021/164579 | | 8/2021 |

OTHER PUBLICATIONS

Extended European Search Report for European Patent Application No. 21958626.0, mailed Sep. 16, 2024 (9 pages).

First Examination Report for Australian Patent Application No. 2021466220, mailed Oct. 17, 2024 (3 pages).

International Search Report and Written Opinion for International Application No. PCT/CN2020/090625, mailed Feb. 20, 2021, 8 pages.

Ericsson, "On NTN synchronization, random access , and timing advance," R1-1912725, 3GPP TSG-RAN WGJ Meeting #99, Reno, USA, Nov. 18-22, 2019, 21 pages.

NTT Docomo, "Time Synchronisation for IIOT," R2-1818254, 3GPP TSG-RAN WG2 #104, Spoken, USA, Nov. 12-16, 2018, 10 pages.

Oppo, "Remaining issues for procedure of 2-step RACH," R1-2000477, 3GPP TSG RAN WGJ #100, e-Meeting, Feb. 24-Mar. 6, 2020, 3 pages.

CATT, "PRACH design and UL timing advance" 3GPP TSG RAN WG1 Meeting #97, R1-1906325, Reno, USA, May 13-17, 2019 (7 pages).

Extended European Search Report for EP Appl. No. 20896116.9, dated Nov. 8, 2022 (8 pages).

Office Action for CA Appl. No. 3,161,251, dated Mar. 12, 2024 (6 pages).

First Office Action for CN Appl. No. 202310923232.3, dated Apr. 4, 2024 (with English translation, 12 pages).

Notice of Acceptance for Australian Patent Application No. 2021466220, mailed Dec. 3, 2024 (3 pages).

International Search Report and Written Opinion for International Application No. PCT/CN2021/121152, mailed on Mar. 30, 2022, 9 pages.

First Examination Report for co-pending AU Appl. No. 2021467047, filed on Sep. 28, 2021, Report dated Oct. 7, 2024, 3 pages.

Second Examination Report for co-pending AU Appl. No. 2021467047, filed on Sep. 28, 2021, Report dated Nov. 15, 2024, 3 pages.

Extended European Search Report for co-pending EP Appl. No. 21958623.7 Report dated Oct. 28, 2024, 10 pages.

Sony, "FL summary 6 of AI 8.15.2: Timing relationships for IoT-NTN" 3GPP TSG RAN WG1#106-e a-Meeting, Aug. 16-27, 2021, R1-2108637, 58 pages.

Nokia et al., "Further discussion on RACH issues for NR NTN" 3GPP TSG-RAN WG2 Meeting #115 Electronic Elbonia, Aug. 16-27, 2021, R2-2108114, 6 pages.

MediaTek Inc. "Timing relationship enhancements for NR-NTN" 3GPP TSG RAN WG1 Meeting #102e R1-2005495, Aug. 24-28, 2020, 6 pages.

Media Tek Inc. "Timing relationship enhancements for IoT-IoT NTN" 3GPP TSG RAN WG1 Meeting #106-e R1-2107068, e-Meeting, Aug. 16-27, 2021, 8 pages.

International Search Report and Written Opinion for PCT/CN2021/121147, filed on Sep. 28, 2021, Report dated Apr. 26, 2022, 8 pages.

Third Examination Report for co-pending AU Appl. No. 2021467047, filed on Sep. 28, 2021, Report dated Dec. 9, 2024, 3 pages.

Notice of Acceptance for Australian Patent Application No. 2021467047, mailed Jan. 13, 2025, 3 pages.

First Examination Report for co-pending IN Patent Application No. 202417016732, dated Apr. 27, 2026, 8 pages.

Non-Final Office Action for co-pending U.S. Appl. No. 18/605,617, dated Feb. 23, 2026, 34 pages.

Office Action for Japanese Patent Application No. 2024-516624, dated Apr. 1, 2025, 7 pages with unofficial English translation.

Office Action for Japanese Patent Application No. 2024-516624, dated Aug. 8, 2025, 5 pages with English summary.

Nokia et al., "Enhancement to time and frequency synchronization for NB-IoT/eMTC over NTN" 3GPP TSG RAN WG1 #106, R1-2107173, e-Meeting, Aug. 16-27, 2021, 12 pages.

Notice of Allowance for Japanese Patent Application No. 2024-516624, dated Nov. 4, 2025, 2 pages with unofficial English translation.

CATT, "Time and frequency synchronization enhancement for IoT over NTN," 3GPP TSG RAN WG1 #106-e, R1-2106953, e-Meeting, Aug. 16-27, 2021, 7 pages.

Office Action for Korean Patent Application No. 10-2024-7008564, dated Jan. 6, 2026, 10 pages with unofficial English translation.

Notice of Reasons for Refusal for Japanese Patent Application No. 2024-130892, dated Jun. 10, 2025, 8 pages with unofficial English translation.

Decision to Grant a Patent for Japanese Patent Application No. 2024-130892, dated Sep. 16, 2025, 5 pages with unofficial English translation.

Office Action for Korean Patent Application No. 10-2022-7022132, dated Dec. 10, 2025, 9 pages with unofficial English translation.

* cited by examiner

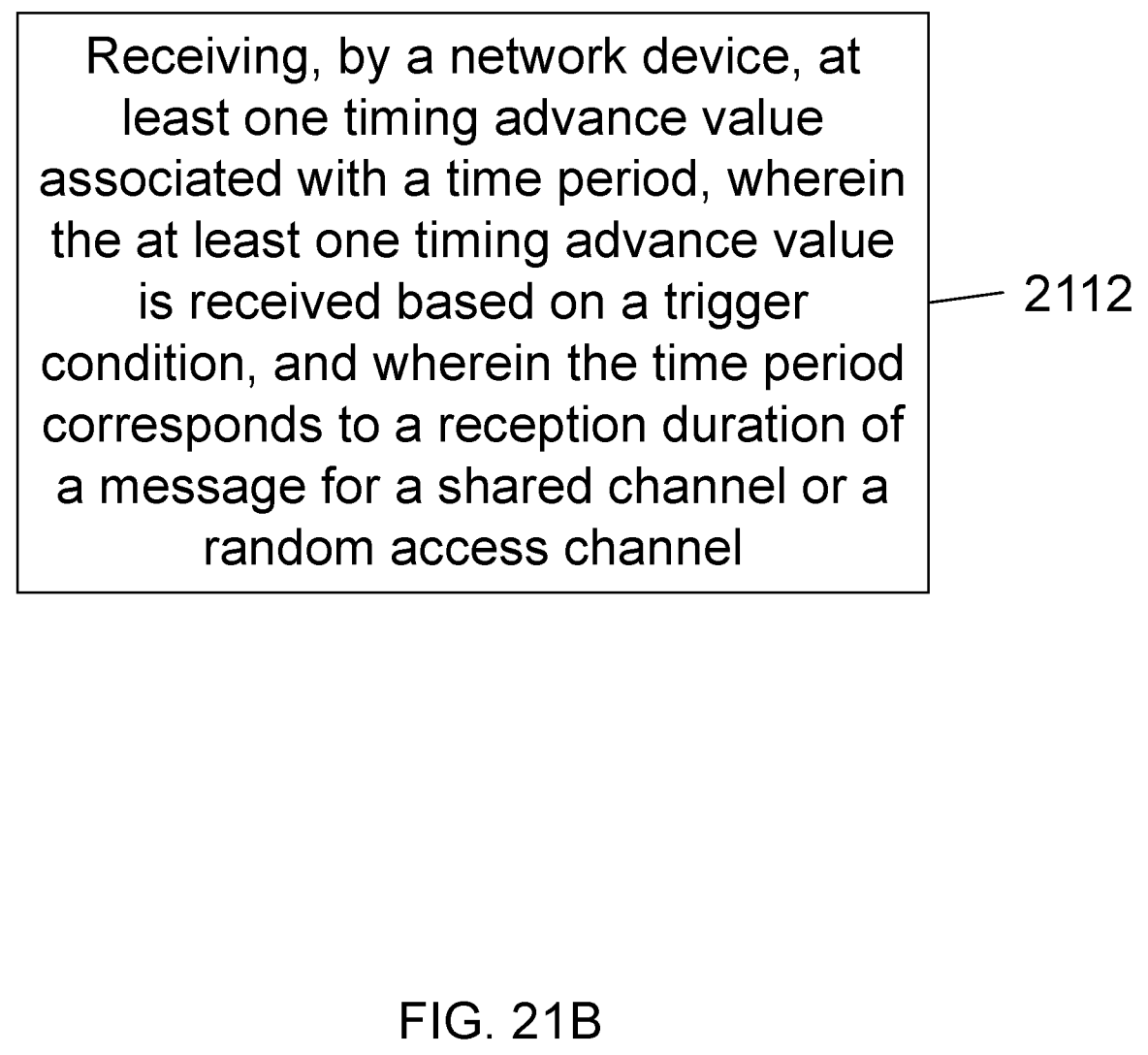

Receiving, by a network device, at least one timing advance value associated with a time period, wherein the at least one timing advance value is received based on a trigger condition, and wherein the time period corresponds to a reception duration of a message for a shared channel or a random access channel

2112

FIG. 21B

TECHNIQUES FOR MANAGING TIMING ADVANCE REPORT

CROSS-REFERENCE TO RELATED APPLICATION

This application is a continuation and claims priority to International Application No. PCT/CN2021/121147, filed on Sep. 28, 2021, the disclosure of which is hereby incorporated by reference herein in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for determining when to transmit and/or the content to include in a timing advance (TA) report.

An example wireless communication method comprises transmitting, by a communication device, at least one timing advance value associated with a time period, wherein the at least one timing advance value is transmitted based on a trigger condition, and wherein the time period corresponds to a transmission duration of a message for a shared channel or a random access channel.

In some embodiments, the trigger condition indicates that the at least one timing advance value is transmitted in response to the at least one timing advance value being above a threshold value. In some embodiments, the trigger condition indicates that the at least one timing advance value is transmitted in response to the at least one timing advance value associated with a corresponding segment being different from another timing advance value associated with another segment, and the another segment is located prior to the corresponding segment in time domain. In some embodiments, the at least one timing advance value includes an applied timing advance value that is applied by the communication device or a reported timing advance value that is according to a reporting granularity. In some embodiments, the reporting granularity includes one time slot or two time slots.

In some embodiments, trigger condition indicates that the transmitting the at least one timing advance value includes transmitting a largest timing advance value from a plurality of timing advance values. In some embodiments, the trigger condition indicates that the largest timing advance value from a plurality of timing advance values is transmitted in response to the largest timing advance value being above a threshold value. In some embodiments, trigger condition indicates that the largest timing advance value from a plurality of timing advance values is transmitted in response to the largest timing advance value associated with a corresponding segment being different than another timing advance value associated with another segment, and the another segment is located prior to the corresponding segment in time domain. In some embodiments, the at least one timing advance value correspond to at least one segment in the time period.

In some embodiments, the trigger condition specifies that the at least one timing advance value is a first timing advance value of a first segment in a plurality of segments in time domain. In some embodiments, the trigger condition specifies that the at least one timing advance value is a last timing advance value of a last segment in a plurality of segments in time domain. In some embodiments, the trigger condition specifies that the transmitting the at least one timing advance value includes transmitting each timing advance value of each of a plurality of segments. In some embodiments, the trigger condition specifies that the transmitting the at least one timing advance value includes transmitting every other timing advance value corresponding to every other segment of a plurality of segments in time domain. In some embodiments, the transmitting includes transmitting a timing advance report that includes an indication that indicates a relative value of a first timing advance value compared to a second timing advance value, the first timing advance value is within a first time period and the second timing advance value is within a second time period, the first time period is later in time than the second time period for which the communication device transmitted another timing advance report that included the second timing advance value, and the another timing advance report is transmitted prior to the timing advance report.

In some embodiments, the indication is a 1-bit value that indicates that: (1) the first timing advance value is greater than the second timing advance value, or (2) the first timing advance value is less than the second timing advance value. In some embodiments, the at least one timing advance value or the timing advance report is transmitted by the communication device in response to receiving from a network device a grant message that indicates that the network device requests the at least one timing advance value or the timing advance report from the communication device. In some embodiments, the at least one timing advance value or the timing advance report is transmitted by the communication device based on a criterion that includes any one of: transmission of the at least one timing advance value periodically, or transmission of the at least one timing advance value for every time period, or transmission of the at least one timing advance value for an initial time period in at least one time period. In some embodiments, the trigger condition includes the criterion or the receiving the grant message.

In some embodiments, the trigger condition indicates that the at least one timing advance value is transmitted in response to the at least one timing advance value being below a threshold value. In some embodiments, the trigger condition indicates that the largest timing advance value from a plurality of timing advance values is transmitted in response to the largest timing advance value being below a threshold value.

Another example wireless communication method comprises receiving, by a network device, at least one timing advance value associated with a time period, wherein the at least one timing advance value is received based on a trigger condition, and wherein the time period corresponds to a reception duration of a message for a shared channel or a random access channel.

In some embodiments, the time period comprises a plurality of segments. In some embodiments, the trigger condition indicates that the at least one timing advance value is received in response to the at least one timing advance value being above a threshold value. In some embodiments, the trigger condition indicates that the at least one timing advance value is received in response to the at least one timing advance value associated with a corresponding segment being different from another timing advance value associated with another segment, and the another segment is located prior to the corresponding segment in time domain. In some embodiments, the at least one timing advance value includes an applied timing advance value that is applied by a communication device or a reported timing advance value that is according to a reporting granularity. In some embodiments, the reporting granularity includes one time slot or two time slots. In some embodiments, the trigger condition indicates that receiving the at least one timing advance value include receiving a largest timing advance value from a plurality of timing advance values. In some embodiments, the trigger condition indicates that the largest timing advance value from a plurality of timing advance values is received in response to the largest timing advance value being above a threshold value.

In some embodiments, the trigger condition indicates that the largest timing advance value from a plurality of timing advance values is received in response to the largest timing advance value associated with a corresponding segment being different than another timing advance value associated with another segment, and the another segment is located prior to the corresponding segment in time domain. In some embodiments, the at least one timing advance value correspond to a least one segment in the time period. In some embodiments, the trigger condition specifies that the at least one timing advance value is a first timing advance value of a first segment in a plurality of segments in time domain. In some embodiments, the trigger condition specifies that the at least one timing advance value is a last timing advance value of a last segment in a plurality of segments in time domain. In some embodiments, the trigger condition specifies that the receiving the at least one timing advance value includes receiving each timing advance value of each of a plurality of segments.

In some embodiments, the trigger condition specifies that the receiving the at least one timing advance value includes receiving every other timing advance value corresponding to every other segment of a plurality of segments in time domain. In some embodiments, the receiving includes receiving a timing advance report that includes an indication that indicates a relative value of a first timing advance value compared to a second timing advance value, the first timing advance value is within a first time period and the second timing advance value is within a second time period, the first time period is later in time than the second time period for which the network device received another timing advance report that included the second timing advance value, and the another timing advance report is received prior to the timing advance report. In some embodiments, the indication is a 1-bit value that indicates that: (1) the first timing advance value is greater than the second timing advance value, or (2) the first timing advance value is less than the second timing advance value.

In some embodiments, the at least one timing advance value or the timing advance report is received by the network device in response to transmitting by the network device a grant message that indicates that the network device requests the at least one timing advance value or the timing advance report from a communication device. In some embodiments, the trigger condition includes the criterion or the transmitting the grant message. In some embodiments, the at least one timing advance value or the timing advance report is received by the network device based on a criterion that includes any one of: reception of the at least one timing advance value periodically, or reception of the at least one timing advance value for every time period, or reception of the at least one timing advance value for an initial time period in at least one time period. In some embodiments, the trigger condition indicates that the at least one timing advance value is received in response to the at least one timing advance value being below a threshold value. In some embodiments, the trigger condition indicates that the largest timing advance value from a plurality of timing advance values is received in response to the largest timing advance value being below a threshold value.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 21B shows an exemplary flowchart for receiving timing advance value(s).

DETAILED DESCRIPTION

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Introduction

In non-terrestrial network (NTN), due to high mobility and altitude of satellite or aerial vehicle, the propagation delay and Doppler can be large. In order to reduce the impact of large delay and Doppler in uplink (UL) synchronization, pre-compensation with the help of assistance information from network is assumed at a user equipment (UE) side in current 3GPP discussion. Generally, the UE specific timing advance (TA) corresponding to service link is estimated and pre-compensated by UE. As a result, TA report transmitted by the UE to a base station (BS) is required since the BS should obtain the full TA information for scheduling. Since the propagation delay and TA drift are large compared to traditional terrestrial network, the TA report mechanism should be investigated with consideration of latency and frequency.

Moreover, in IoT-NTN, segmented pre-compensation could be applied to handle the fast varying TA. That is, one UL transmission time period is divided into multiple segments and the pre-compensated TA for each segment can be different. In this case, how to report TA should also be investigated.

A description of the certain terms used in this patent document is further explained below:

- Scheduling: in uplink (UL) transmission, a base station (BS) will send a physical downlink control channel (PDCCH) to control when and how the physical uplink shared channel (PUSCH) is transmitted. This procedure is called scheduling.
- Timing relationship: when PDCCH controls when PUSCH is transmitted, BS will indicate UE an offset between the time instant UE receives PDCCH and time instant UE transmit PUSCH. The PUSCH scheduling offset is one type of timing relationship.
- Relationship between timing advance (TA) and scheduling offset: BS will indicate UE an offset of PUSCH transmission. UE will advance the start time of PUSCH transmission based on TA. If TA is larger than the scheduling offset, it means that UE will transmit PUSCH before receiving scheduling message (PDCCH), which is not possible. So the scheduling offset should be determined based on reported TA.

I.(a). Non-Terrestrial Network (NTN) Structure

Figure 1:
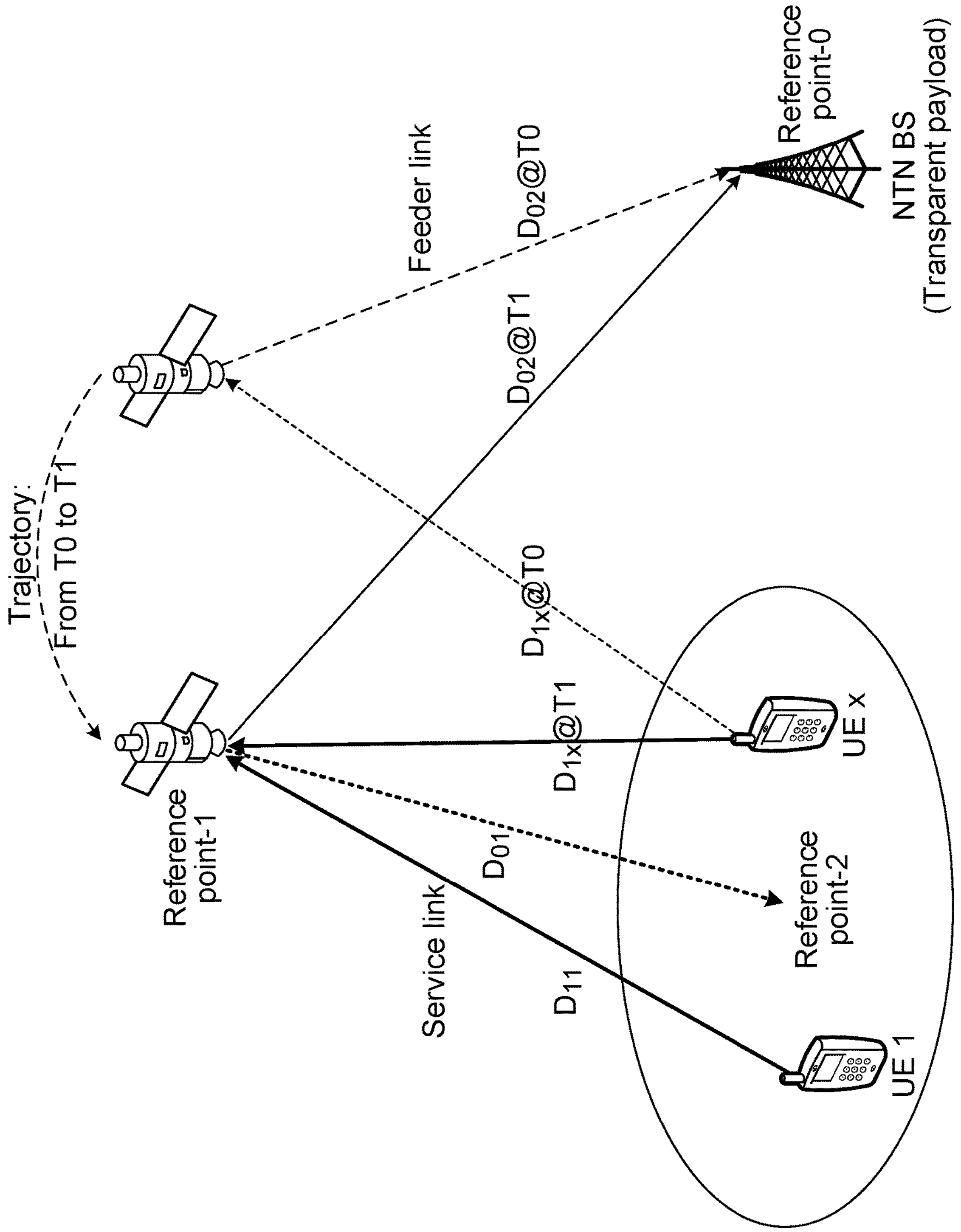
FIG. 1 shows an example structure of non-terrestrial network (NTN).

The structure of transparent NTN is illustrated in FIG. 1. As shown in FIG. 1, the link between UE and satellite is known as the service link while the link between BS and satellite is known as the feeder link. Note that the feeder link delay is common for all UEs within the same cell.

During pre-compensation, the pre-compensated TA can be divided into two parts: UE specific TA estimated by UE, and common TA indicated by BS (which may be 0). There are several mechanisms for pre-compensation. The baseline in current 3GPP discussion is as follows: The UE specific TA corresponding to service link is estimated by UE (based on UE position and satellite position) while the common TA corresponding to feeder link is estimated by BS and broadcast to UE. At least the UE specific TA estimated by UE should be reported to BS.

I.(b). Segmented Pre-Compensation in IoT-NTN

In NB-IoT and eMTC, the transmission duration of one physical uplink shared channel (PUSCH) could be long since repetitions may be applied to increase coverage. Therefore, in IoT-NTN, the initial pre-compensated TA and Doppler may not be accurate enough for the whole transmission duration of a PUSCH or physical random access channel (PRACH) due to fast variation of propagation delay and Doppler. In order to handle at least this technical problem, the whole transmission duration of a PUSCH or PRACH should be divided into several segments and pre-compensated TA and Doppler values can be updated for each segment, which avoids the synchronization lost.

One technique is to apply different pre-compensation of TAs and/or frequency offsets for different components of single UL transmission (e.g., segmented pre-compensation). Moreover, how to report TA for segmented pre-compensation scenario may include a reporting method applicable to UL transmission cases, e.g., Msg-3 in four-step RACH and normal PUSCH transmissions. This patent document more fully describes example reporting methods and formats in the following sections.

II. Embodiment-1: TA Report Method for Segmented Pre-Compensation

Figure 2:
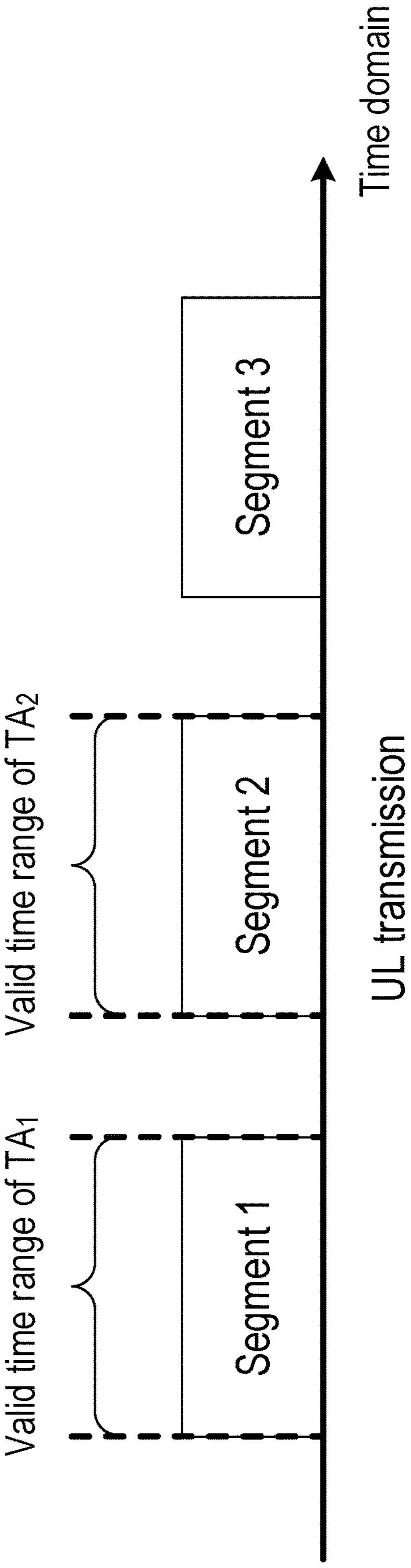
FIG. 2 shows an example segmentation within an uplink transmission time period.
Figure 3:
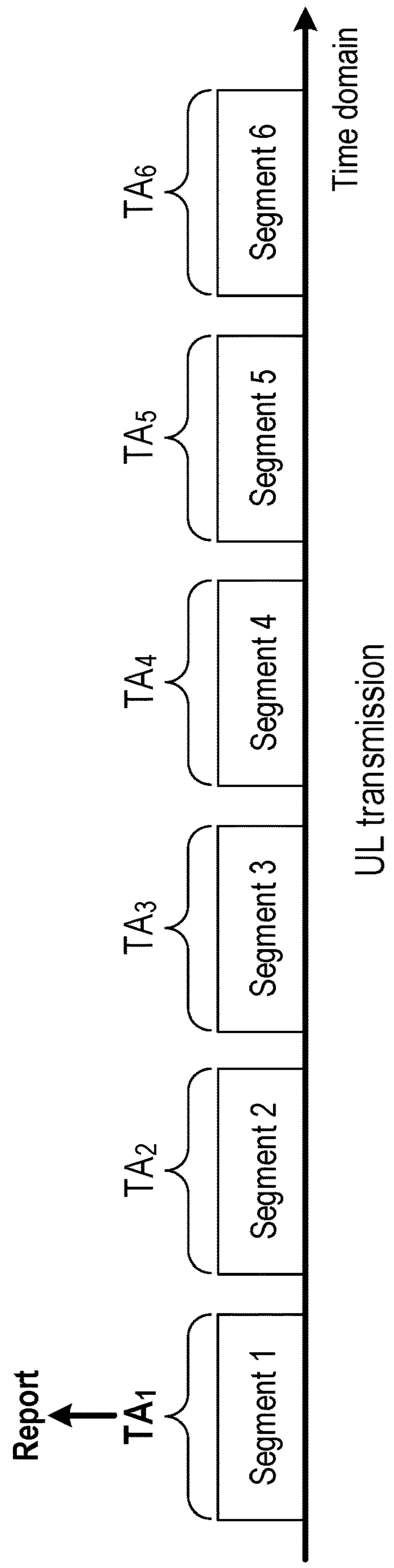
FIG. 3 shows a transmission of an example report for a first timing advance (TA).
Figure 4:
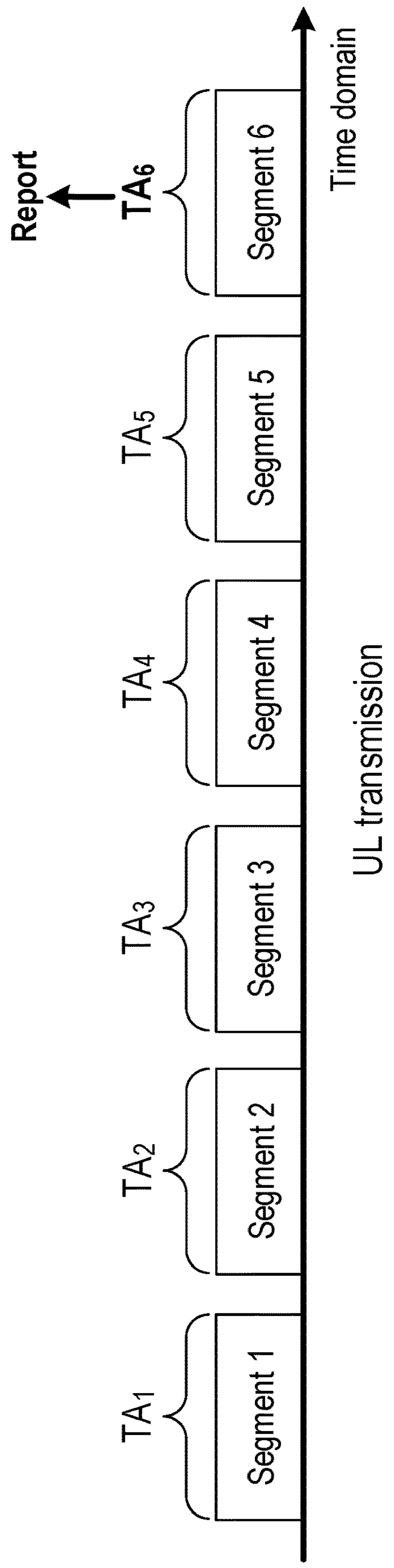
FIG. 4 shows a transmission of an example report for a last TA.
Figure 5:
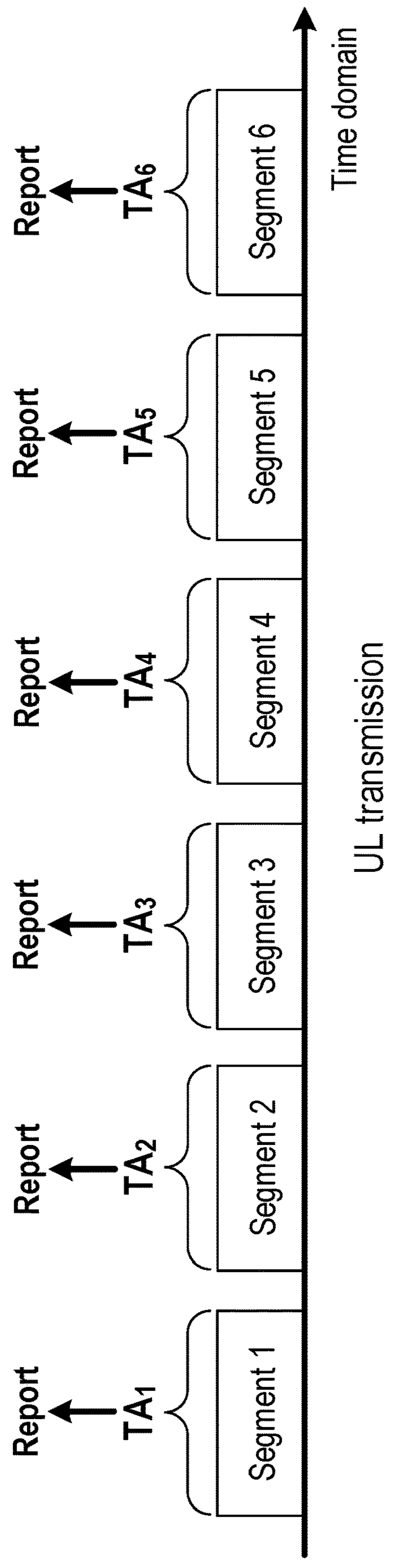
FIG. 5 shows a transmission of a single report comprising TAs of every segment.

As mentioned in the Introduction (Section I), the pre-compensated TA and frequency offset values should be able to be updated within one UL transmission time period in IoT-NTN to allow the timing and/or frequency drifts to be within a tolerable range. Hence, a whole transmission time period should be divided into segments and for each segment the pre-compensated TA and/or frequency offset can be updated as shown in FIG. 2. In some embodiments, the time period corresponds to a transmission duration of a message for a shared channel or a random access channel. In some embodiments, the transmission time period comprises a plurality of segments.

Figure 6:
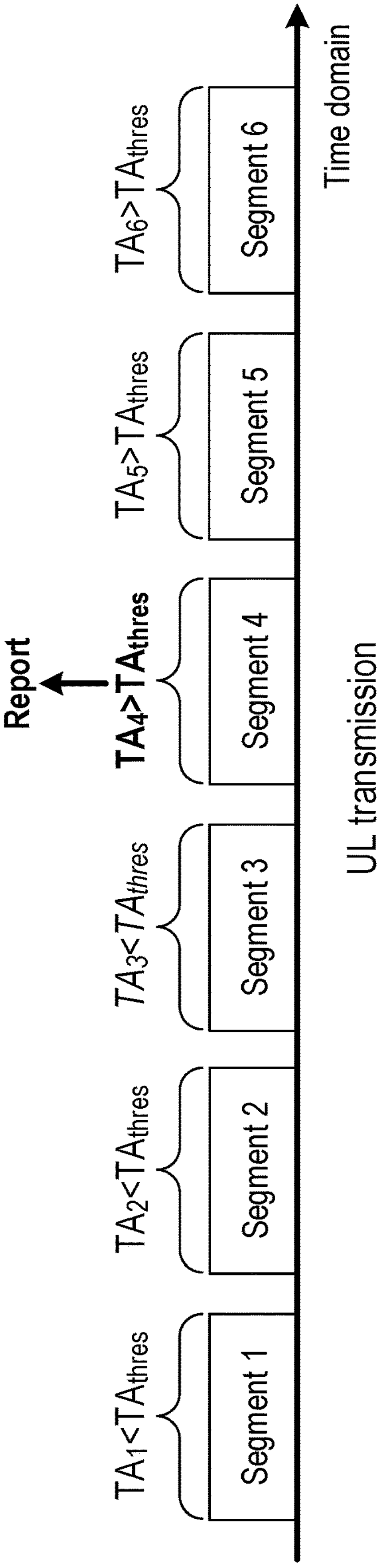
FIG. 6 shows a transmission of an example report comprising a TA corresponding to segment where trigger condition is satisfied.

Due to segmented pre-compensation for long UL transmission, multiple different TAs may be used across multiple segments. The following methods can be considered for reporting:

1. A UE reports a TA corresponding to one segment chosen based on deterministic way, e.g.,
   a. The first TA, e.g., TA of first segment.
   b. The last TA, e.g., TA of last segment.
   c. The middle TA, e.g., TA of middle segment.
2. A UE reports a series of TAs corresponding to multiple segments chosen based on deterministic way, e.g.,
   a. TAs of first and last segments.
   b. TAs of every segment.
   c. TAs of every other segment.
3. A UE transmits to the BS reports comprising one or more TAs corresponding to segments chosen based on certain criteria, which includes any one or more of the following:
   a. Trigger condition is satisfied at one or more segments, e.g., the applied TA value increases over certain threshold or decreases below certain threshold, as further described in FIG. 6. The applied TA value is the TA value that the UE applies to synchronize the transmitted signals to the BS. The reported TA value is the TA value that is reported to the BS. In some embodiments, the threshold over which the applied TA value increases is the same value as the threshold below which the applied TA value decreases. In some other embodiments, the threshold over which the applied TA value increases is different from the threshold below which the applied TA value decreases.
   b. The reported TA values (with consideration of reporting granularity, which may be slot or half slot) of the segments change compared to previous reported TA value of a previous segment, as further described in FIG. 7.
   c. The largest applied TA across all segments, as further described in FIG. 8.
   d. The largest applied TA across the segments where trigger condition is satisfied. This may be a combination of Option A and Option C mentioned above in Method 3. The difference compared with Option C of Method 3 is that no TA will be reported by the UE if the UE determines that a trigger condition is not satisfied.

In some other embodiments, UE can report (i.e., transmit to BS) TA values that it applied in UL synchronization. In some other embodiments, UE can report (i.e., transmit to BS) TA values which are obtained by expressing the applied values in UL synchronization with different granularity.

Figure 7:
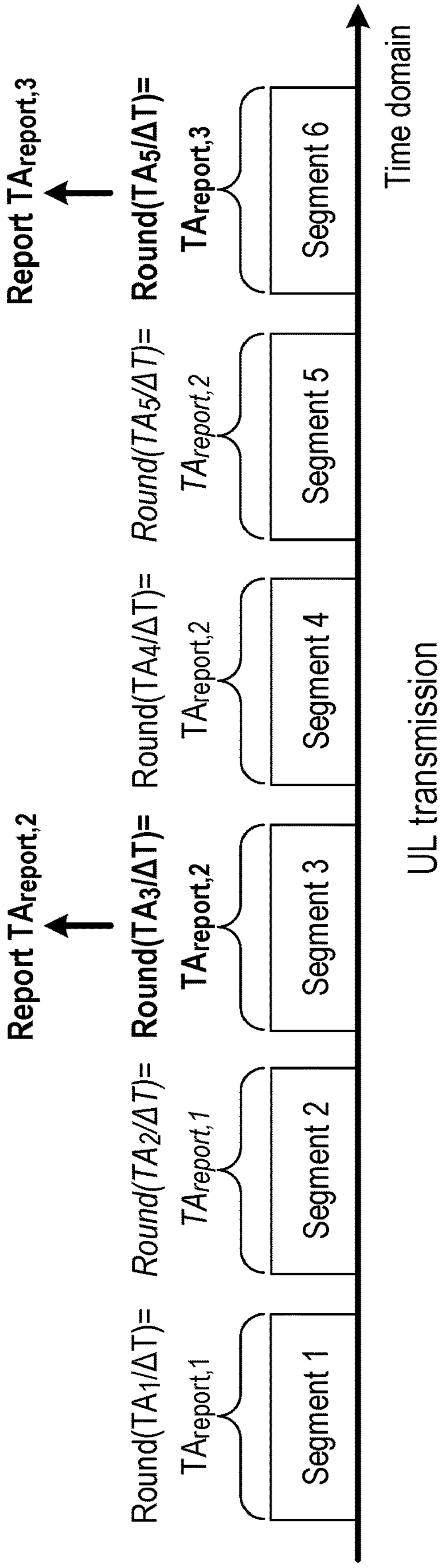
FIG. 7 shows a transmission of an example report comprising TAs corresponding to segments where the reported values change.
Figure 8:
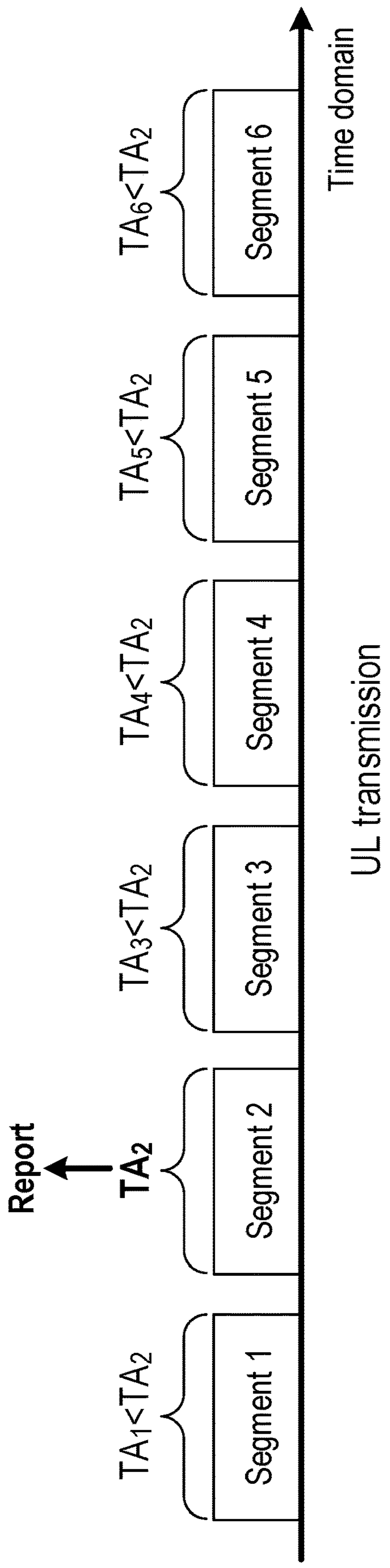
FIG. 8 shows a transmission of an example report comprising a largest TA across all segments.
Figure 9:
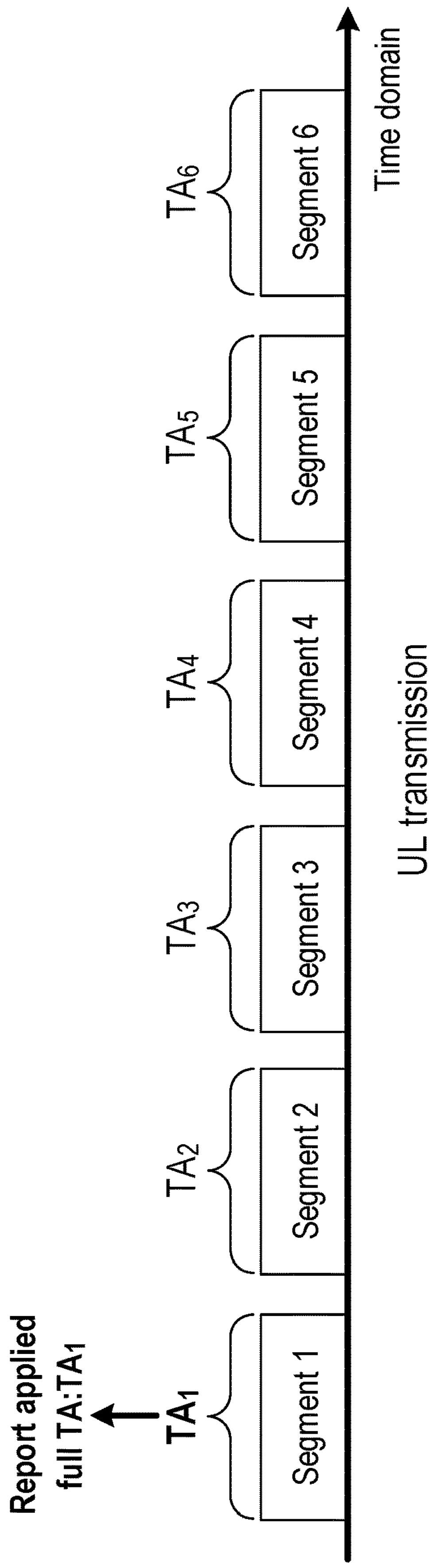
FIG. 9 shows a transmission of an example report comprising a first TA, full TA is reported.
Figure 10:
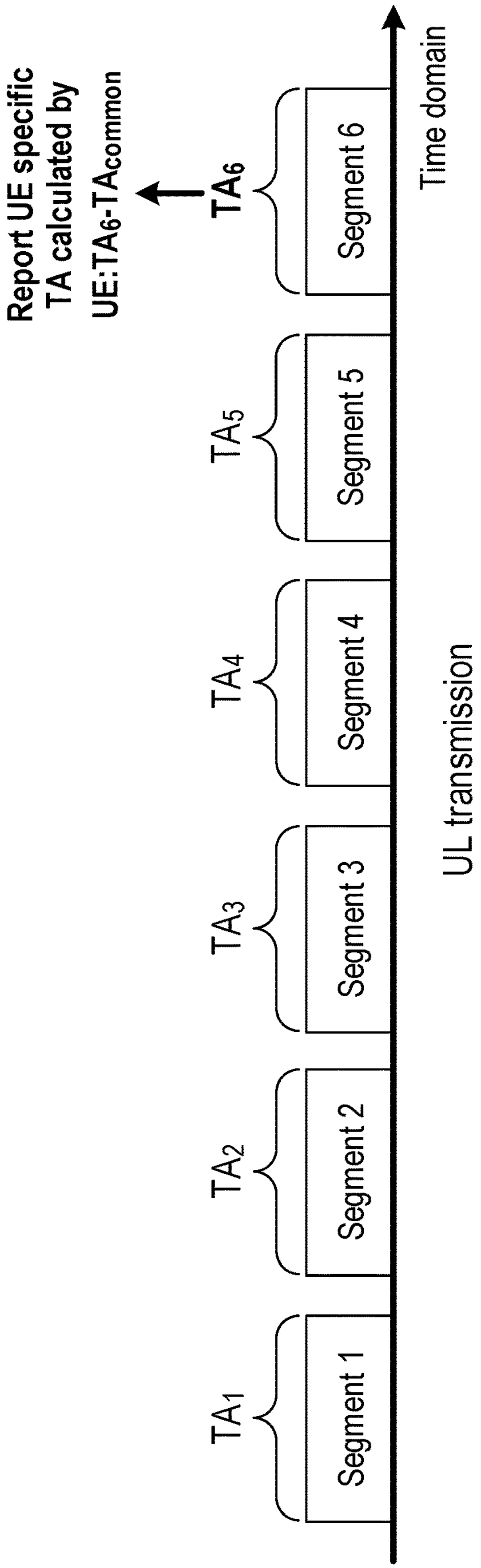
FIG. 10 shows a transmission of an example report comprising a last TA where UE-specific TA calculated by UE is reported.

Some of above examples are illustrated as shown in FIGS. 3 to 8 with an example scenario where information associated with 6 segments are transmitted by the UE. With respect to method associated with FIG. 7, the reported values may be same as previous set of TAs that are transmitted previously even if the different TAs are applied for different segments when the required reporting granularity is coarse. That is, the technique associated with FIG. 7 is different from the method where TA is reported when the TA of one segment is different from previous TA of a previous segment that is immediately prior to the one segment in time domain. Generally, BS adjusts the scheduling offset based on the time unit of slot, e.g., the reporting granularity of TA can be set as a slot, which is much coarser than the granularity of applied TA (16*Ts). Therefore, before reporting new TA, UE should first check whether the reported values would change compared to previous values under the reporting granularity. For example, the TAs for two segments are assumed as TA_1 and TA_2, respectively. The reporting granularity is assumed as $\Delta T$ and the values round($TA\_1/\Delta T$) and round ($TA\_2/\Delta T$) are assumed reported. If round($TA\_1/\Delta T$)=round ($TA\_2/\Delta T$), reporting of only one value is enough even if $TA\_1 \neq TA\_2$. FIG. 7 illustrates an example of such reporting method.

In addition, due to the possible mobility of satellite and UE, the reported information may be accurate only within a certain period. Hence, UE can also report the time information associated with reported information, e.g., which segment corresponds to the reported TA, so that BS and UE have consensus on the validity of reported information.

III. Embodiment-2: TA Report Content

As mentioned in the Introduction (Section I), TA report in NTN is more frequent than in traditional TN. Hence, the reporting content may be enhanced with the consideration of signaling overhead and implementation complexity. Following options can be considered for TA report:

1. UE directly reports the full TA applied in pre-compensation, which includes both common TA indicated by network (may be 0) and UE-specific TA calculated by UE. This method avoids BS to derive common TA variation, which reduces the complexity requirement at BS.
2. UE only reports UE-specific TA calculated by UE (generally corresponding to service link as shown in FIG. 1). This method reduces the value range of reported TA. Moreover, the drift rate of reported TA is smaller.
3. UE reports differential TA compared to previous reported TA. The signaling overhead is saved since the range of differential value is much smaller. In some embodiments, the differential TA is compared to the latest previous reported TA. In some other embodiments, the differential TA is compared to the initial reported TA. Note that the differential TA may be based on either full TA or UE-specific TA calculated by UE. Generally, if the initial reported TA is full TA, the following differential TAs will be delta values of full TA. If the initial reported TA is UE-specific TA calculated by UE, the differential TAs will be delta values of UE specific TA. Also, the corner cases where initial TA is full TA and differential TA is based on UE specific TA, or initial TA is UE specific TA and differential TA is full TA, cannot be excluded.
4. UE reports an adjustment step. Since the reporting granularity of TA can be coarse (e.g., a slot as discussed in embodiment-1), the reported value is not likely to change over one unit compared to previous reported one when the time interval between two reports is not too large. The one unit is based on a granularity of TA reporting so that, for example, if the granularity of TA reporting is set to one time slot, then the one unit is one time slot. In this case, UE only needs to report change direction of TA instead of the detailed value to save signaling overhead (which can be regarded as a special case of reporting differential TA). For example, 3 states can be defined for TA report, which only occupy 2 bits in signaling:

a. TA is increased by one step (e.g., increase one unit) compared to previous one
b. TA is decreased by one step (e.g., decrease one unit) compared to previous one
c. TA is not changed For example, use '01' to indicate increase (state a), '10' to indicate decrease (state b), '00' to indicate no change (state c). If TA report is triggered only when the reported value changes, the number of states can be further reduced to 2 and only 1 bit signaling is enough. For example, use '0' to indicate increase, '1' to indicate decrease, and no report to indicate no change.

Figure 11:
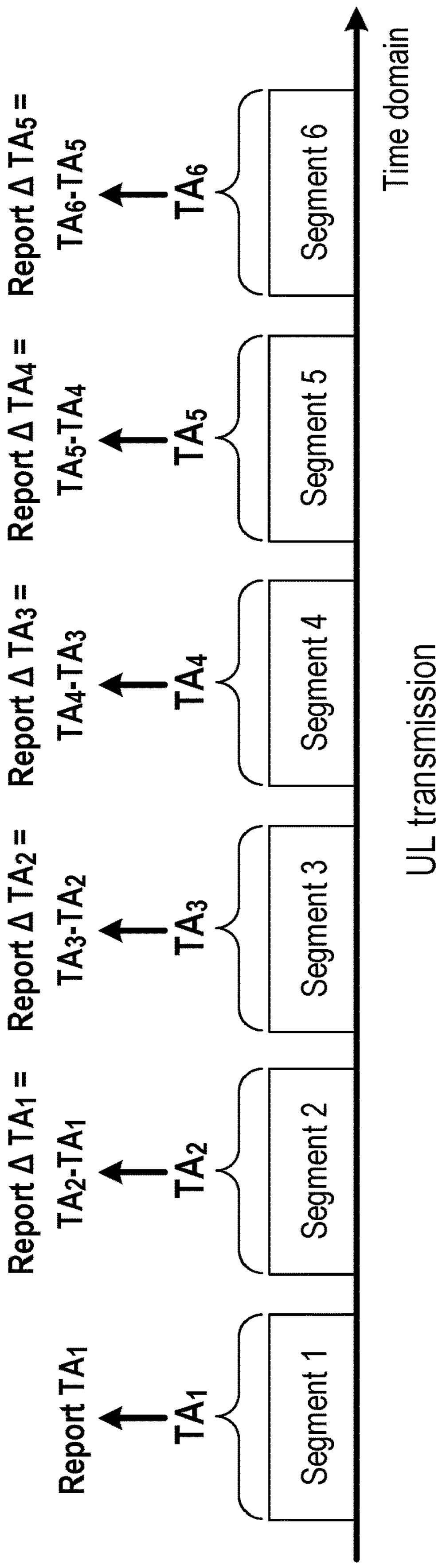
FIG. 11 shows a transmission of an example report comprising TAs of every segment, where differential TA is reported for segments within same UL transmission.
Figure 12:
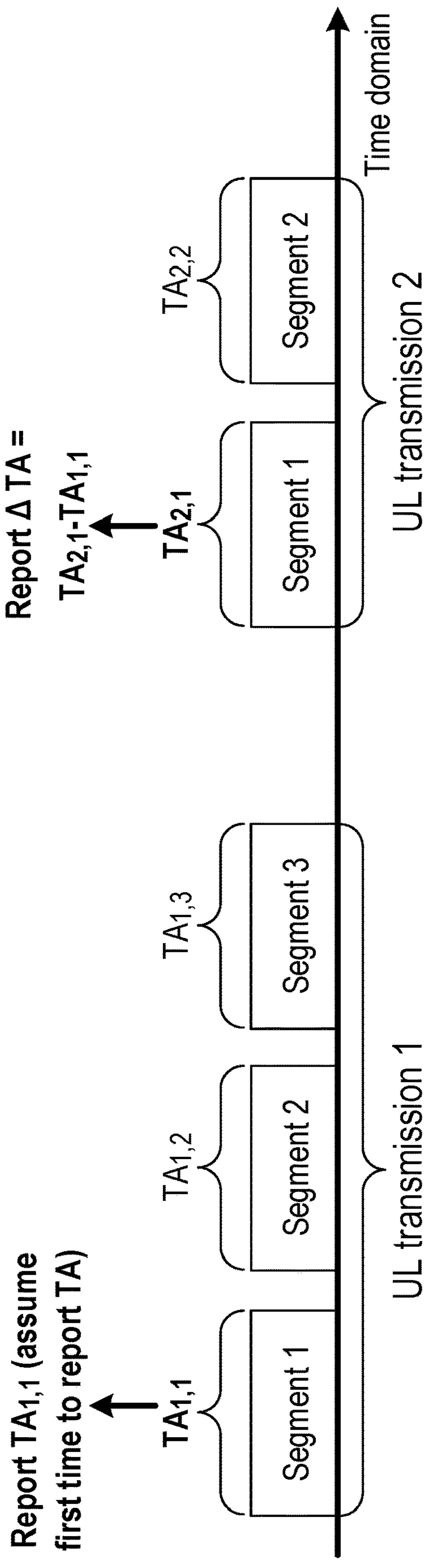
FIG. 12 shows a transmission of an example report comprising a first TA, where differential TA is reported between different UL transmissions.
Figure 13:
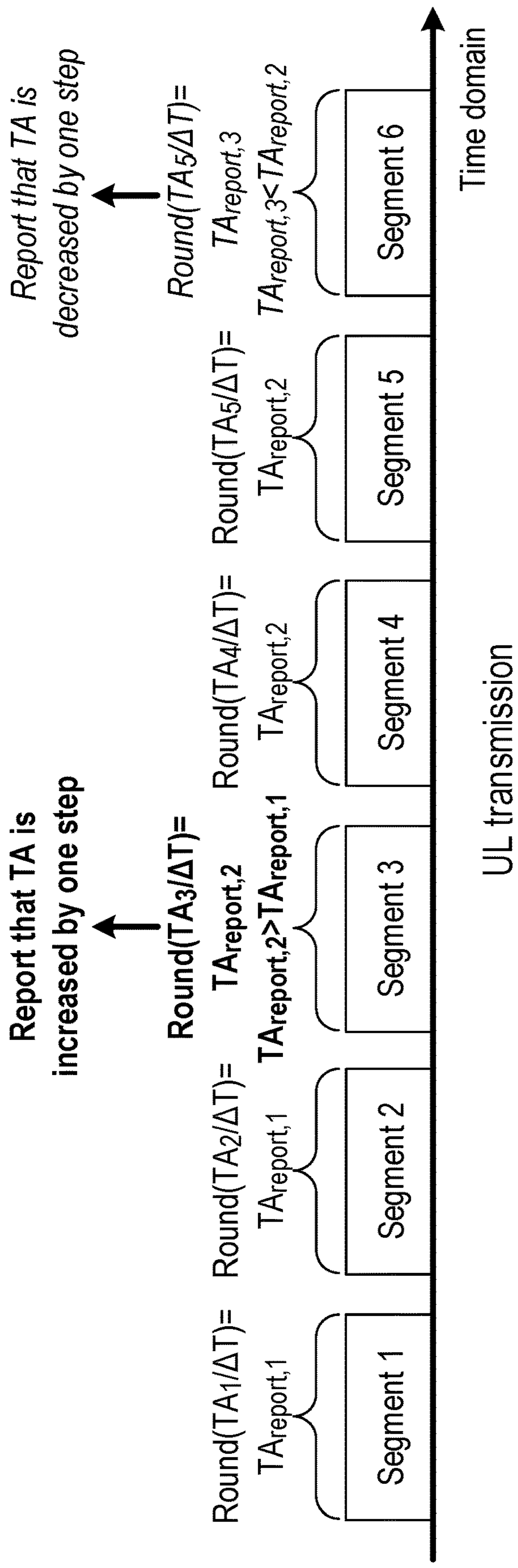
FIG. 13 shows a transmission of an example report comprising TAs corresponding to segments where the reported values change, where adjustment step is reported with two example states.
Figure 14:
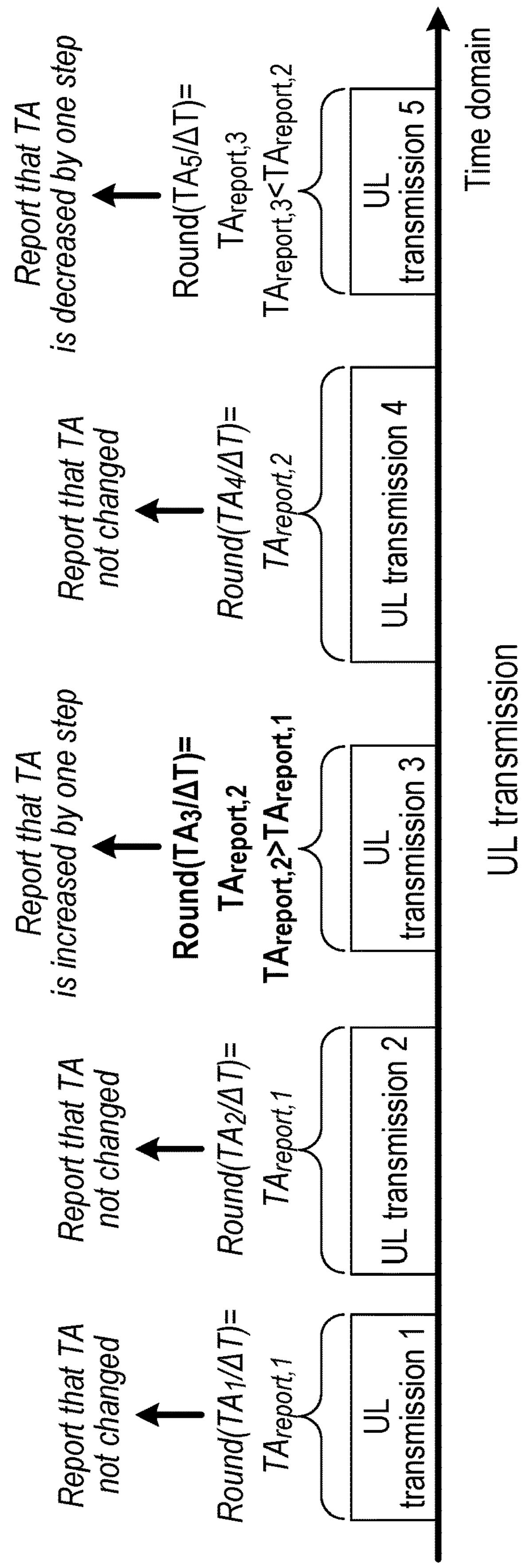
FIG. 14 shows a transmission of an example report comprising TAs for every UL transmission, where adjustment step is reported with three example states.

The above options can be applied for both NR-NTN and IoT-NTN. When combined with IoT-NTN, the options can be freely combined with the reporting methods introduced in embodiment-1 as shown in example FIG. 9 to FIG. 13, where TAx refers to the full TA applied for segment x. A full TA is a TA value applied by the UE for synchronization of transmission signals, which includes both UE specific TA estimated by UE and common TA indicated by BS. The differential reporting format can be applied either for segments within same UL transmission, as shown in FIG. 11, or between different UL transmissions, as shown in FIG. 12. As for NR-NTN, an example illustrates the case where UE reports for every UL transmission and adjustment step is reported as shown in FIG. 14.

IV. Embodiment-3: TA Report Procedure for UL Scheduling

In this embodiment, how to trigger the TA report for UL scheduling is illustrated. Note that the trigger methods are applicable for both NR-NTN and IoT-NTN. For IoT-NTN, the trigger methods can be freely combined with the reporting methods in embodiment-1. Moreover, the TA report content can be either one illustrated in embodiment-2.

Case 1: TA Report is Requested by the Network.

Figure 15:
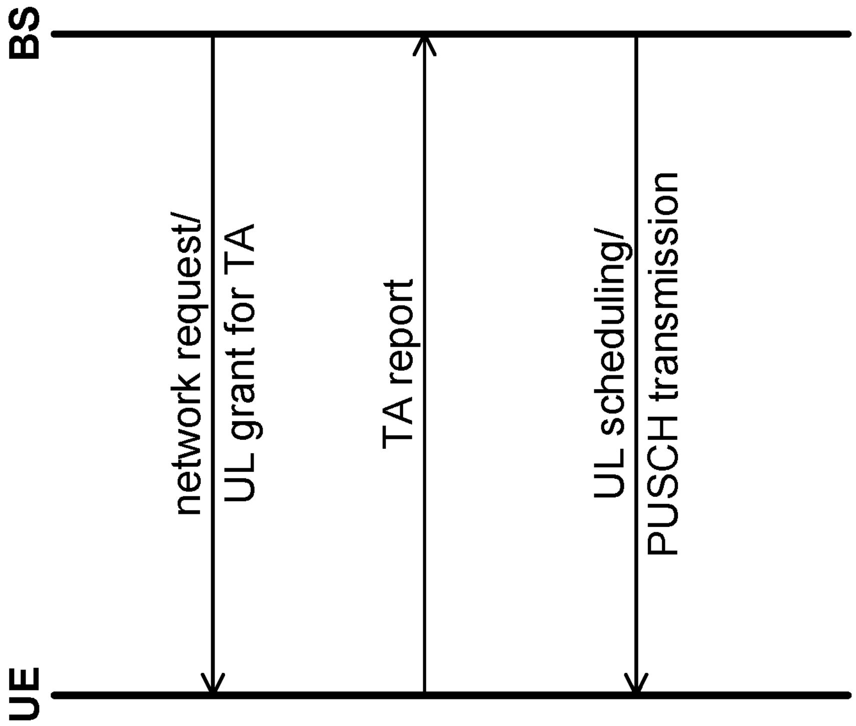
FIG. 15 shows an example flowchart for transmitting TA report for UL scheduling based on network request.

TA report is triggered by the network request, the procedure can be referred in FIG. 15: The network indicated a request or UL grant for TA report and then UE perform TA report. Afterwards, the BS can determine UE-specific offset in the timing relationship of PUSCH scheduling based on the reported TA value.

Case 2: TA Report is Triggered by UE

In this case, TA report is triggered at UE side based on certain criteria, e.g., 1. UE reports TA based on a period. For example, the UE periodically reports the TA.
2. UE reports TA for every transmission
3. UE reports TA for initial transmission
4. UE reports TA when an event is triggered, e.g., when TA increases over a threshold or decreases below a threshold. Note that for trigger based report, there may be a latency between the time instants when trigger condition is satisfied (e.g., TA increase over a threshold) and when actual report is performed. Hence, the reported TA value may be determined based on:
   a. The TA at the time instant when trigger condition is met
   b. The TA at the time instant when PUSCH/PUCCH carrying the reporting payload is transmitted
   c. The TA at certain reference time after the trigger and before the report.
5. UE reports TA when the reported value changes compared to previous reported one (with consideration on reporting granularity)

Figure 16:
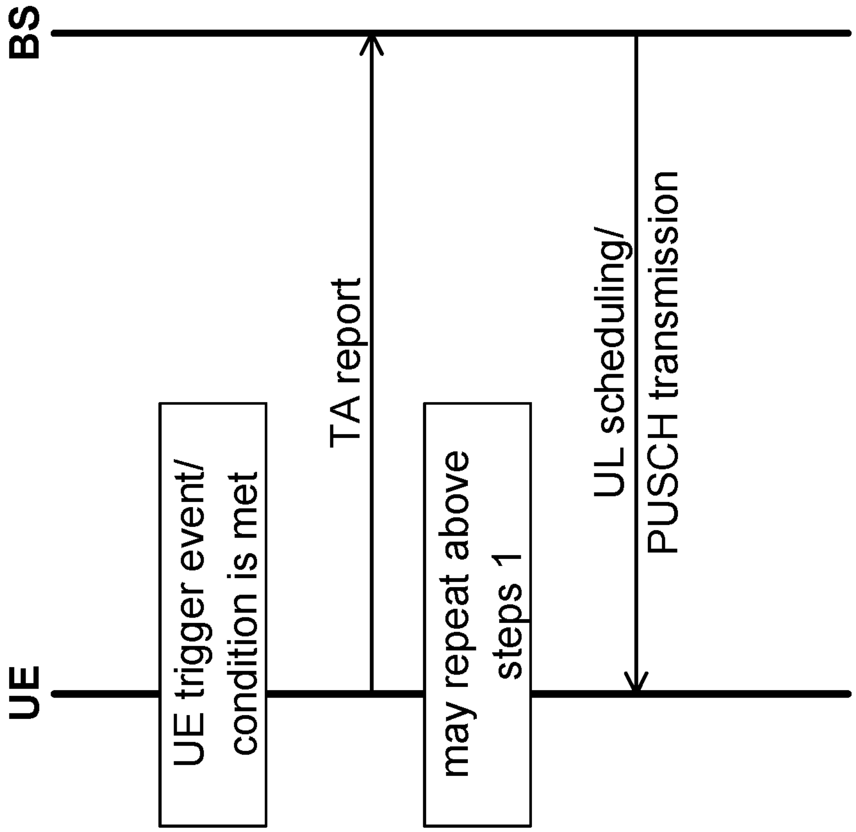
FIG. 16 shows an example flowchart for transmitting TA report for UL scheduling when triggered by UE

The procedure can be referred in FIG. 16: UE finds that the trigger condition for TA report is satisfied and then UE perform TA report. The report may be triggered several times only if the TA is varying along with the time. Afterwards, the timing relationship of scheduling PUSCH can apply a UE-specific offset obtained from the reported TA value.

In an embodiment, TA report is triggered by UE. The reported TA is 1 bit (report the adjustment step) and can be directly conveyed in SR transmission since the required bit field is small. When the gNB receives the SR, it can update the TA value via either increase one step or decrease one step (a given unit). Then the subsequent transmission of BSR or PUSCH transmission can be scheduled with the corresponding UE-specific offset.

In some other embodiments, trigger methods illustrated above including network request and UE trigger can all be regarded as some trigger conditions for TA report.

V. Embodiment-4: TA Report Procedure for DL Scheduling

In DL transmission, UE will transmit corresponding HARQ-ACK after receiving PDSCH, which is a type of UL transmission. Hence, TA report is also required for DL scheduling. Similar to that for UL scheduling, TA report procedure for DL scheduling can also be combined with contents in embodiment-1 and embodiment-2.

Case 1: TA Report is Requested by the Network.

Figure 17:
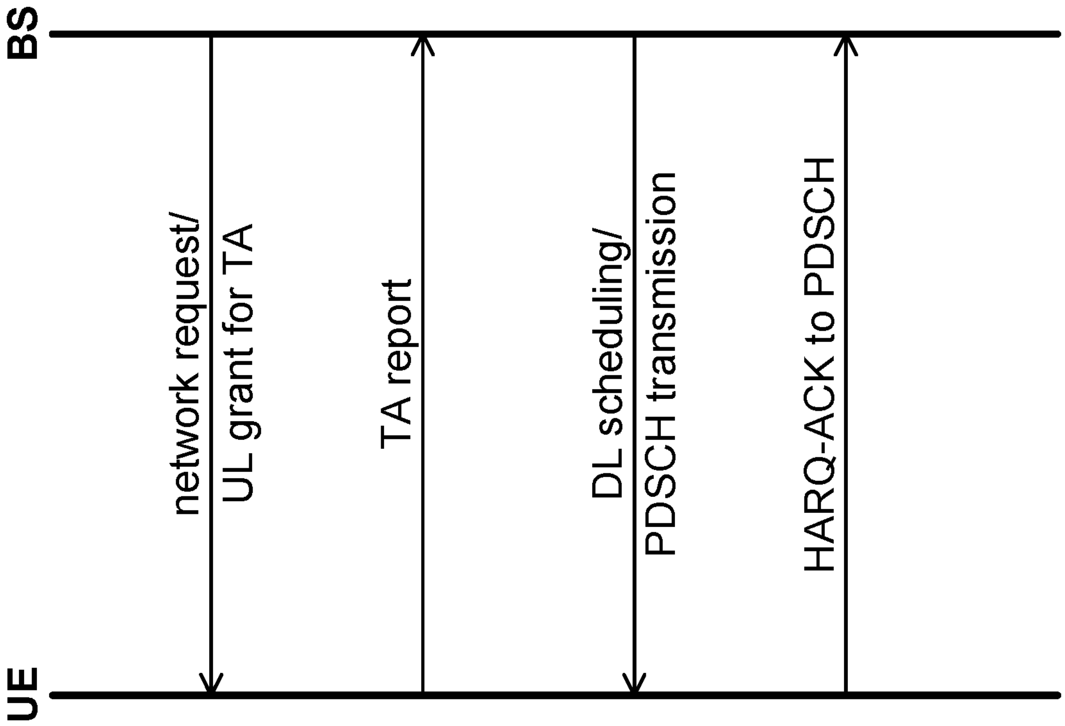
FIG. 17 shows an example flowchart for transmitting TA report for DL scheduling based on network request.

TA report for DL scheduling can be requested by the network and the procedure is similar to that of TA report for UL scheduling. After TA report, there is DL scheduling, as well as PDSCH transmission, then HARQ-ACK to the corresponding PDSCH is transmitted with the timing relationship that applies a UE-specific offset obtained from reported TA value as shown in FIG. 17.

Case 2: TA Report is Triggered by UE

TA report can be triggered at UE side based on certain criteria, e.g.,

1. UE reports TA based on a period. For example, the UE periodically reports the TA.
2. UE reports TA for every transmission.
3. UE reports TA for initial transmission.
4. UE reports TA when an event is triggered, e.g., when TA increases over a threshold or decreases below a threshold. The reported TA value may be determined based on:
   a. The TA at the time instant when trigger condition is met. The trigger condition is described in this patent document at least in FIGS. 6-8
   b. The TA at the time instant when PUSCH/PUCCH carrying the reporting payload is transmitted
   c. The TA at certain reference time after the trigger and before the report
5. UE reports TA when the reported value changes compared to previous reported one (with consideration on reporting granularity).

Figure 18:
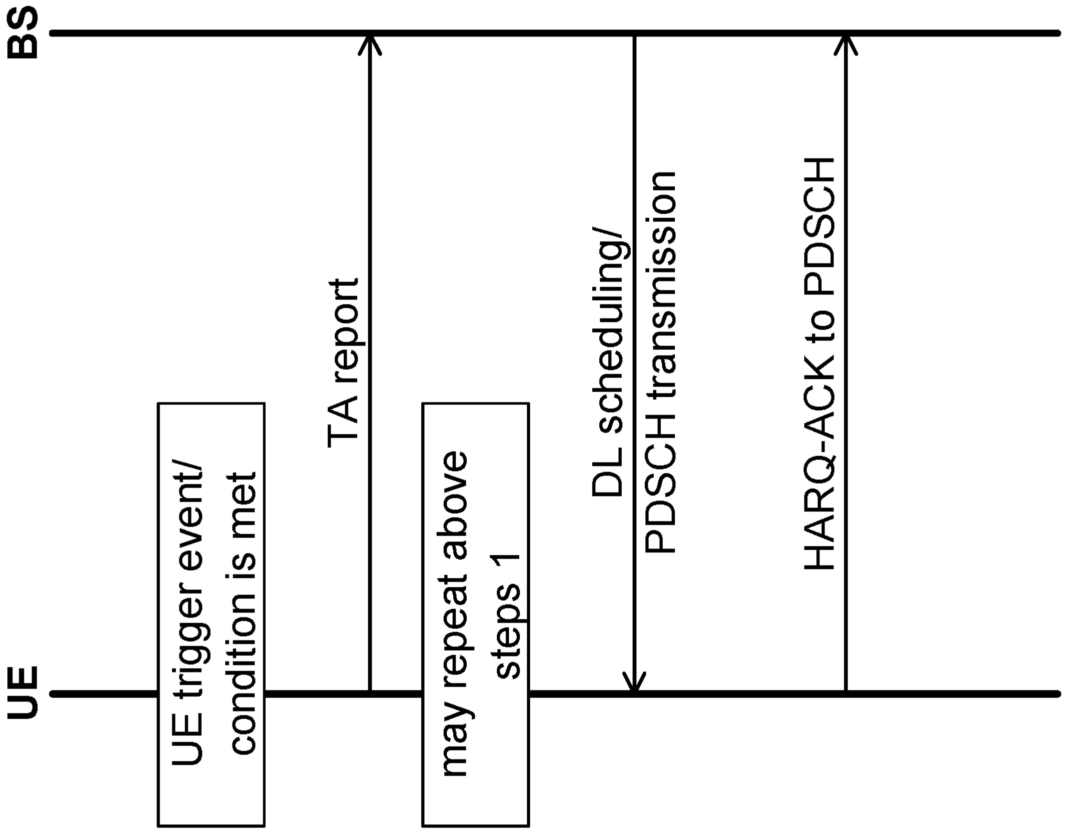
FIG. 18 shows an example flowchart for transmitting TA report for DL scheduling when triggered by UE.

The procedure is similar to that for UL scheduling. After TA report, there is DL scheduling, as well as PDSCH transmission, then HARQ-ACK to the corresponding PDSCH is transmitted with the timing relationship that applies a UE-specific offset obtained from reported TA value as shown in FIG. 18.

Case 3: TA Report is Triggered by UE but Granted by Network Request

Figure 19:
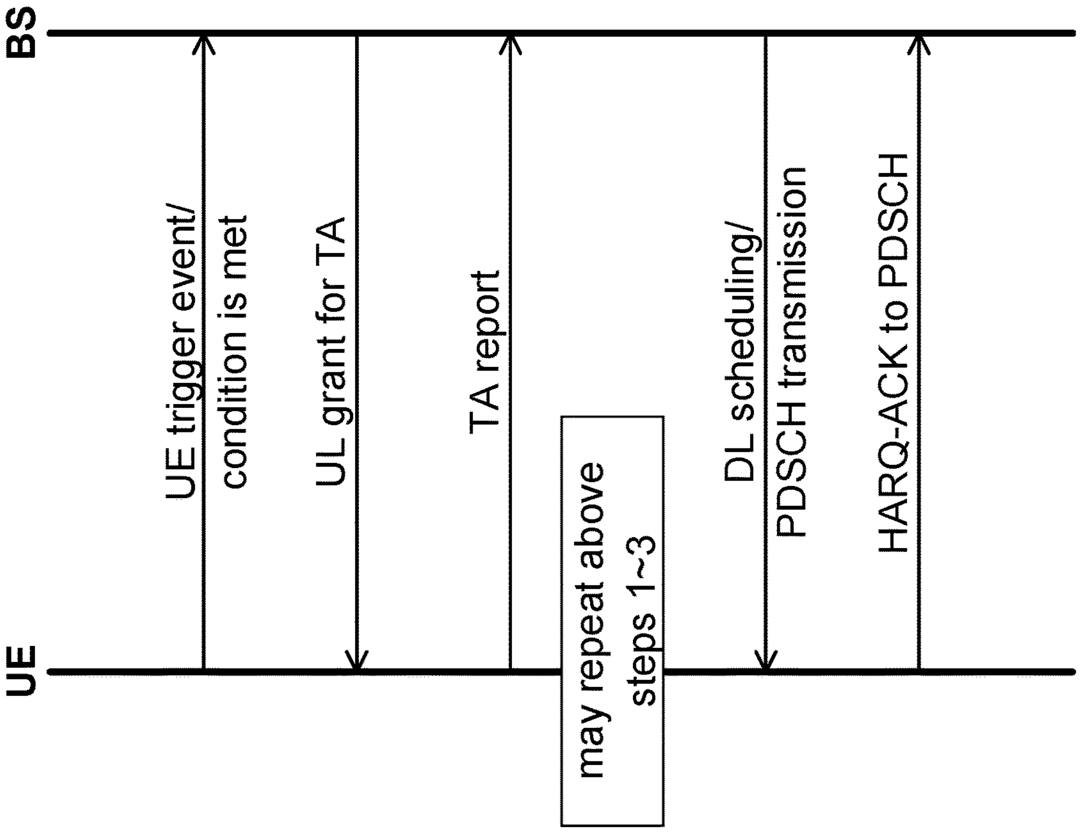
FIG. 19 shows an example flowchart for transmitting TA report for DL scheduling when triggered by UE but granted by network request

In this case, even though TA report is triggered by UE, whether and when to transmit the TA report signaling still depends on network request since UE does not know whether there is DL data to be scheduled. If network is not willing to transmit DL data for a long time, TA report may waste resource especially when full TA is reported (large bit field may be required). The TA report procedure for such case can be referred in FIG. 19: UE finds that the trigger condition for TA report is satisfied and then indicate this fact to network (through 1 bit or a few bits). Then, network will send a request to UE for TA report if necessary. After receiving the network request, UE performs TA report.

Figure 20:
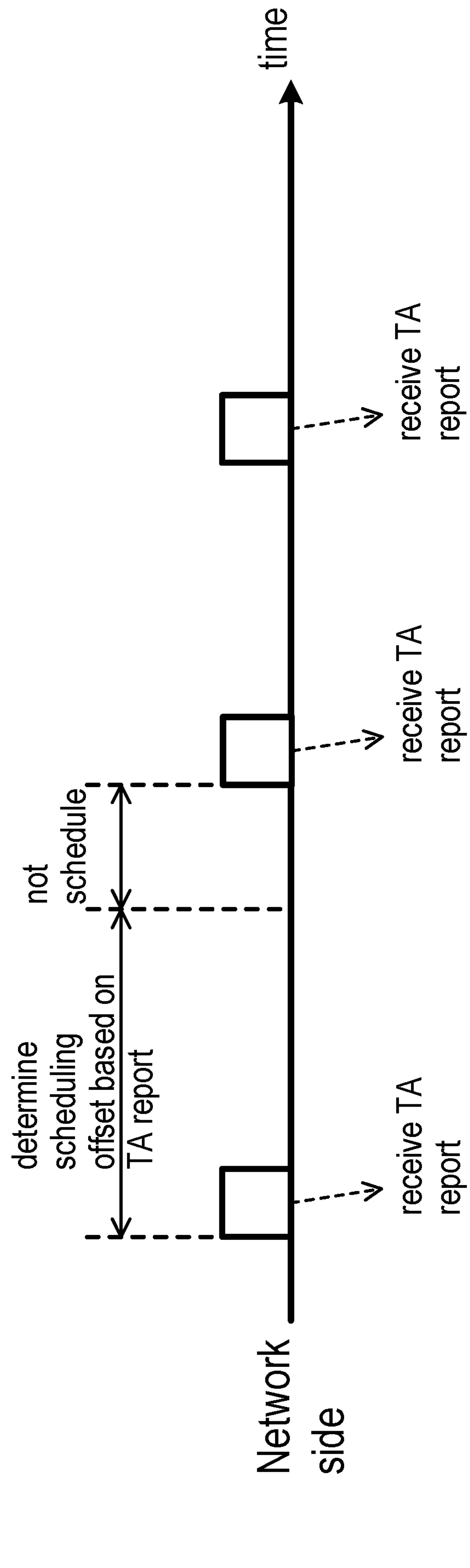
FIG. 20 shows an example timing diagram that shows that a base station (BS) may not schedule DL transmission when a reported TA is outdated.

In an embodiment, as depicted in FIG. 20, the BS may not schedule the DL transmission at the time instant that is already delayed much from the latest TA receiving.

In some other embodiments, trigger methods illustrated above including network request and UE trigger can all be regarded as some trigger conditions for TA report.

Figure 21A:
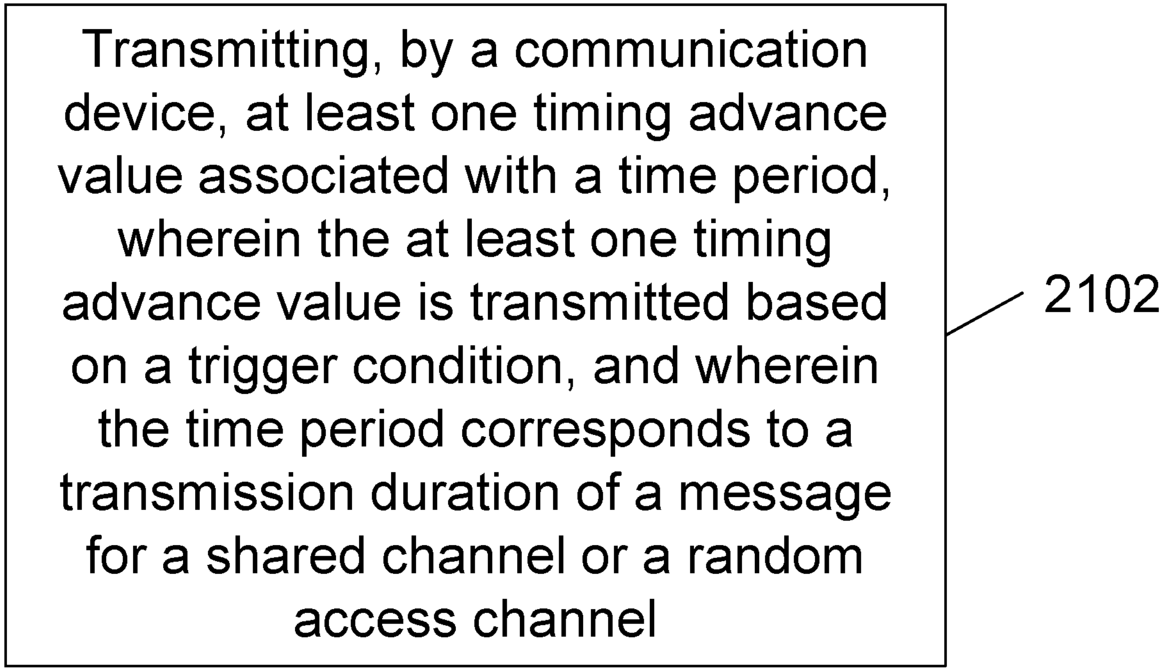
FIG. 21A shows an exemplary flowchart for transmitting timing advance value(s).

FIG. 21A shows an exemplary flowchart for transmitting timing advance value(s). Operation 2102 includes transmitting, by a communication device, at least one timing advance value associated with a time period, wherein the at least one timing advance value is transmitted based on a trigger condition, and wherein the time period corresponds to a transmission duration of a message for a shared channel or a random access channel.

In some embodiments, the time period comprises a plurality of segments. In some embodiments, the trigger condition indicates that the at least one timing advance value is transmitted in response to the at least one timing advance value being above a threshold value. In some embodiments, the trigger condition indicates that the at least one timing advance value is transmitted in response to the at least one timing advance value associated with a corresponding segment being different from another timing advance value associated with another segment, and the another segment is located prior to the corresponding segment in time domain. In some embodiments, the at least one timing advance value includes an applied timing advance value that is applied by the communication device or a reported timing advance value that is according to a reporting granularity. In some embodiments, the reporting granularity includes one time slot or two time slots.

In some embodiments, trigger condition indicates that the transmitting the at least one timing advance value includes transmitting a largest timing advance value from a plurality of timing advance values. In some embodiments, the trigger condition indicates that the largest timing advance value from a plurality of timing advance values is transmitted in response to the largest timing advance value being above a threshold value. In some embodiments, trigger condition indicates that the largest timing advance value from a plurality of timing advance values is transmitted in response to the largest timing advance value associated with a corresponding segment being different than another timing advance value associated with another segment, and the another segment is located prior to the corresponding segment in time domain. In some embodiments, the at least one timing advance value correspond to at least one segment in the time period.

In some embodiments, the trigger condition specifies that the at least one timing advance value is a first timing advance value of a first segment in a plurality of segments in time domain. In some embodiments, the trigger condition specifies that the at least one timing advance value is a last timing advance value of a last segment in a plurality of segments in time domain. In some embodiments, the trigger condition specifies that the transmitting the at least one timing advance value includes transmitting each timing advance value of each of a plurality of segments. In some embodiments, the trigger condition specifies that the transmitting the at least one timing advance value includes transmitting every other timing advance value corresponding to every other segment of a plurality of segments in time domain. In some embodiments, the transmitting includes transmitting a timing advance report that includes an indication that indicates a relative value of a first timing advance value compared to a second timing advance value, the first timing advance value is within a first time period and the second timing advance value is within a second time period, the first time period is later in time than the second time period for which the communication device transmitted another timing advance report that included the second timing advance value, and the another timing advance report is transmitted prior to the timing advance report.

In some embodiments, the indication is a 1-bit value that indicates that: (1) the first timing advance value is greater than the second timing advance value, or (2) the first timing advance value is less than the second timing advance value. In some embodiments, the at least one timing advance value or the timing advance report is transmitted by the communication device in response to receiving from a network device a grant message that indicates that the network device requests the at least one timing advance value or the timing advance report from the communication device. In some embodiments, the at least one timing advance value or the timing advance report is transmitted by the communication device based on a criterion that includes any one of: transmission of the at least one timing advance value periodically, or transmission of the at least one timing advance value for every time period, or transmission of the at least one timing advance value for an initial time period in at least one time period. In some embodiments, the trigger condition includes the criterion or the receiving the grant message.

In some embodiments, the trigger condition indicates that the at least one timing advance value is transmitted in response to the at least one timing advance value being below a threshold value. In some embodiments, the trigger condition indicates that the largest timing advance value from a plurality of timing advance values is transmitted in response to the largest timing advance value being below a threshold value.

FIG. 21B shows an exemplary flowchart for receiving timing advance value(s). Operation 2112 includes receiving, by a network device, at least one timing advance value associated with a time period, wherein the at least one timing advance value is received based on a trigger condition, and wherein the time period corresponds to a reception duration of a message for a shared channel or a random access channel.

In some embodiments, the time period comprises a plurality of segments. In some embodiments, the trigger condition indicates that the at least one timing advance value is received in response to the at least one timing advance value being above a threshold value. In some embodiments, the trigger condition indicates that the at least one timing advance value is received in response to the at least one timing advance value associated with a corresponding segment being different from another timing advance value associated with another segment, and the another segment is located prior to the corresponding segment in time domain. In some embodiments, the at least one timing advance value includes an applied timing advance value that is applied by a communication device or a reported timing advance value that is according to a reporting granularity. In some embodiments, the reporting granularity includes one time slot or two time slots. In some embodiments, the trigger condition indicates that receiving the at least one timing advance value include receiving a largest timing advance value from a plurality of timing advance values. In some embodiments, the trigger condition indicates that the largest timing advance value from a plurality of timing advance values is received in response to the largest timing advance value being above a threshold value.

In some embodiments, the trigger condition indicates that the largest timing advance value from a plurality of timing advance values is received in response to the largest timing advance value associated with a corresponding segment being different than another timing advance value associated with another segment, and the another segment is located prior to the corresponding segment in time domain. In some embodiments, the at least one timing advance value correspond to a least one segment in the time period. In some embodiments, the trigger condition specifies that the at least one timing advance value is a first timing advance value of a first segment in a plurality of segments in time domain. In some embodiments, the trigger condition specifies that the at least one timing advance value is a last timing advance value of a last segment in a plurality of segments in time domain. In some embodiments, the trigger condition specifies that the receiving the at least one timing advance value includes receiving each timing advance value of each of a plurality of segments.

In some embodiments, the trigger condition specifies that the receiving the at least one timing advance value includes receiving every other timing advance value corresponding to every other segment of a plurality of segments in time domain. In some embodiments, the receiving includes receiving a timing advance report that includes an indication that indicates a relative value of a first timing advance value compared to a second timing advance value, the first timing advance value is within a first time period and the second timing advance value is within a second time period, the first time period is later in time than the second time period for which the network device received another timing advance report that included the second timing advance value, and the another timing advance report is received prior to the timing advance report. In some embodiments, the indication is a 1-bit value that indicates that: (1) the first timing advance value is greater than the second timing advance value, or (2) the first timing advance value is less than the second timing advance value.

In some embodiments, the at least one timing advance value or the timing advance report is received by the network device in response to transmitting by the network device a grant message that indicates that the network device requests the at least one timing advance value or the timing advance report from a communication device. In some embodiments, the trigger condition includes the criterion or the transmitting the grant message. In some embodiments, the at least one timing advance value or the timing advance report is received by the network device based on a criterion that includes any one of: reception of the at least one timing advance value periodically, or reception of the at least one timing advance value for every time period, or reception of the at least one timing advance value for an initial time period in at least one time period. In some embodiments, the trigger condition indicates that the at least one timing advance value is received in response to the at least one timing advance value being below a threshold value. In some embodiments, the trigger condition indicates that the largest timing advance value from a plurality of timing advance values is received in response to the largest timing advance value being below a threshold value.

In some embodiments, an apparatus for wireless communication comprises a processor, configured to implement a method recited in one or more of the techniques described in this patent document. In some embodiments, a non-transitory computer readable program storage medium having code stored thereon, the code, when executed by a processor, causing the processor to implement a method recited in one or more of the techniques described in this patent document.

Figure 22:
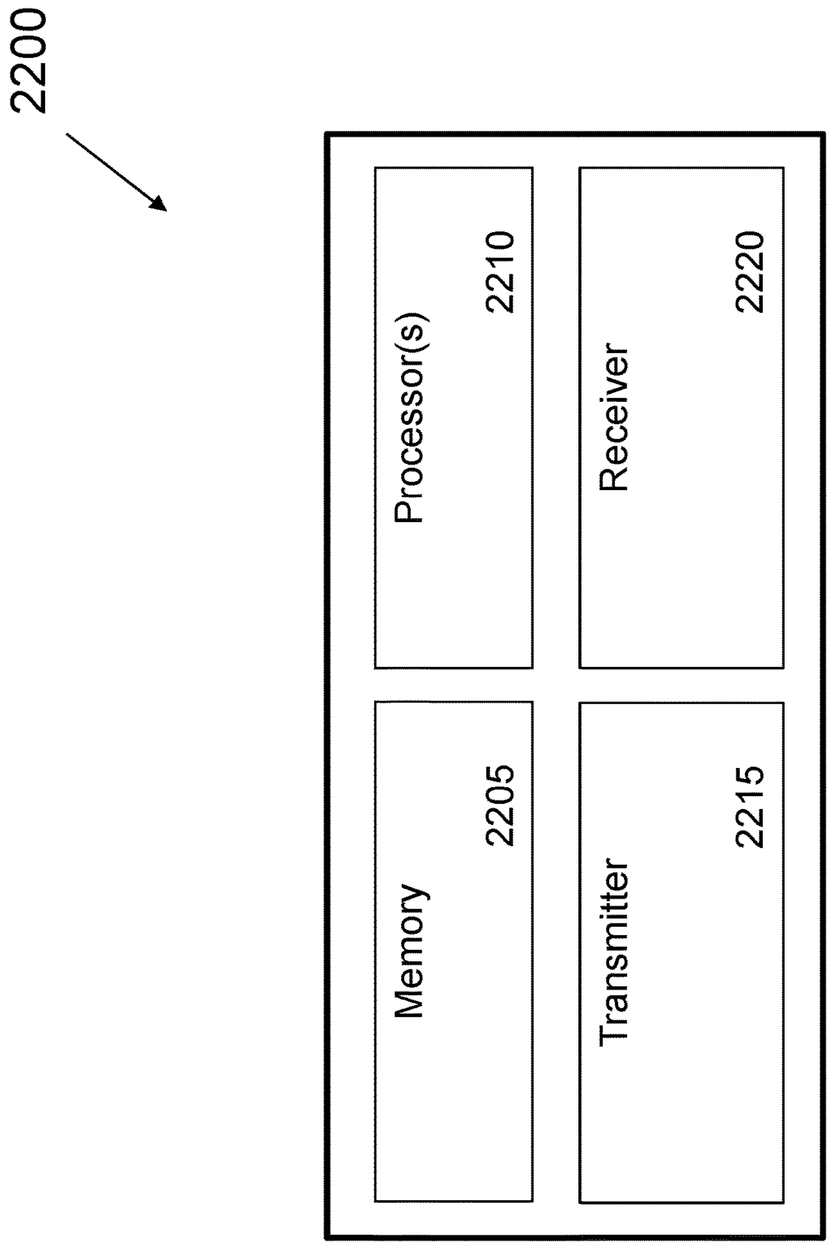
FIG. 22 shows an exemplary block diagram of a hardware platform that may be a part of a network device or a communication device.

FIG. 22 shows an exemplary block diagram of a hardware platform 2200 that may be a part of a network device (e.g., base station) or a communication device (e.g., a user equipment (UE)). The hardware platform 2200 includes at least one processor 2210 and a memory 2205 having instructions stored thereupon. The instructions upon execution by the processor 2210 configure the hardware platform 2200 to perform the operations described in FIGS. 1 to 21B and in the various embodiments described in this patent document. The transmitter 2215 transmits or sends information or data to another device. For example, a network device transmitter can send a message to a user equipment. The receiver 2220 receives information or data transmitted or sent by another device. For example, a user equipment can receive a message from a network device.

Figure 23:
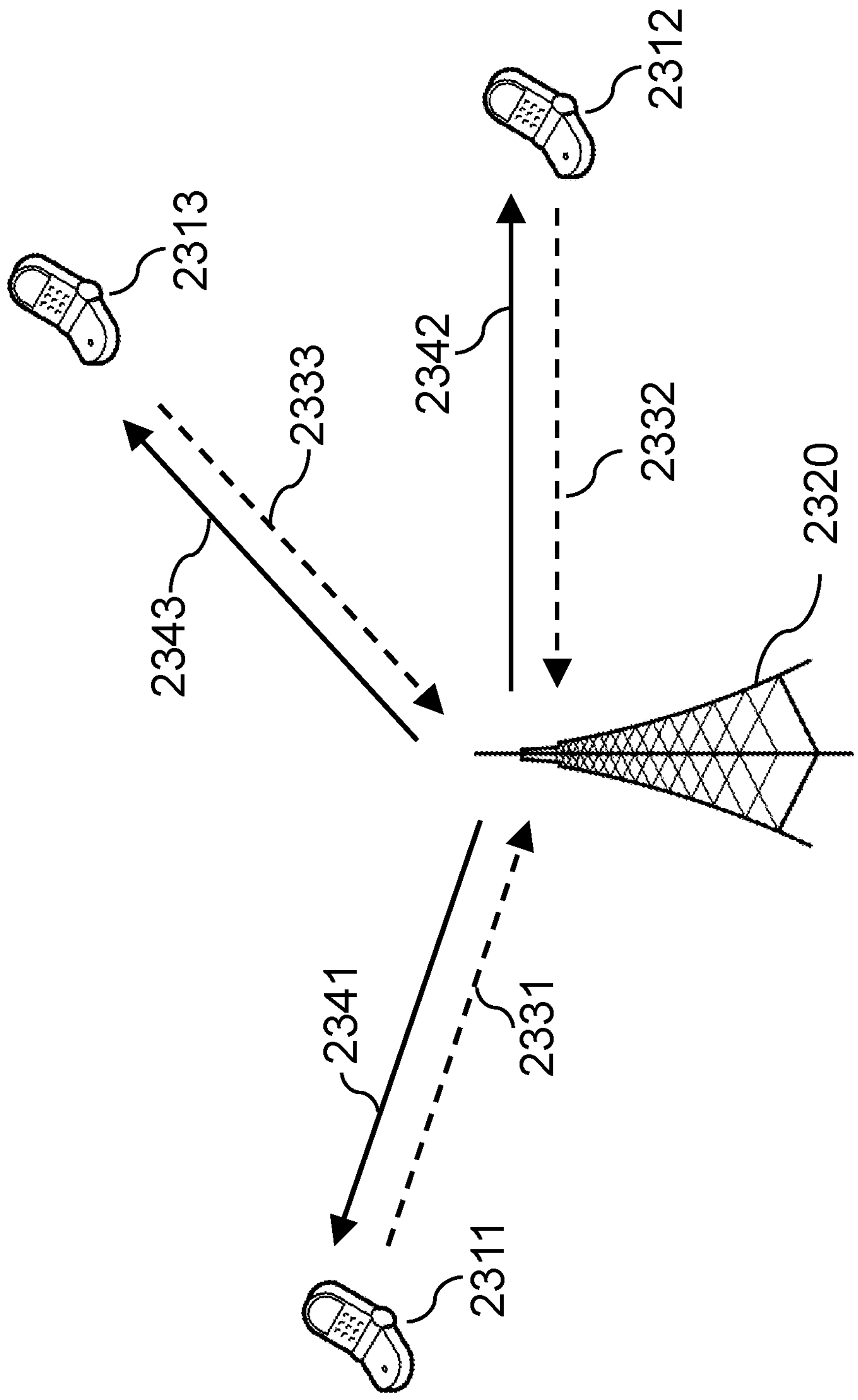
FIG. 23 shows an example of wireless communication including a base station (BS) and user equipment (UE) based on some implementations of the disclosed technology.

The implementations as discussed above will apply to a wireless communication. FIG. 23 shows an example of a wireless communication system (e.g., a 5G or NR cellular network) that includes a base station 2320 and one or more user equipment (UE) 2311, 2312 and 2313. In some embodiments, the UEs access the BS (e.g., the network) using a communication link to the network (sometimes called uplink direction, as depicted by dashed arrows 2331, 2332, 2333), which then enables subsequent communication (e.g., shown in the direction from the network to the UEs, sometimes called downlink direction, shown by arrows 2341, 2342, 2343) from the BS to the UEs. In some embodiments, the BS send information to the UEs (sometimes called downlink direction, as depicted by arrows 2341, 2342, 2343), which then enables subsequent communication (e.g., shown in the direction from the UEs to the BS, sometimes called uplink direction, shown by dashed arrows 2331, 2332, 2333) from the UEs to the BS. The UE may be, for example, a smartphone, a tablet, a mobile computer, a machine to machine (M2M) device, an Internet of Things (IoT) device, and so on.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:

transmitting, by a communication device, at least one timing advance value associated with a time period, wherein the at least one timing advance value is transmitted based on a trigger condition, wherein the time period corresponds to a transmission duration of a message for a shared channel or a random access channel, wherein the transmitting includes transmitting a timing advance report that includes an indication that indicates a relative value of a first timing advance value compared to a second timing advance value, wherein the indication includes a 1-bit value included in the timing advance report that indicates when (1) the first timing advance value is greater than the second timing advance value, (2) the first timing advance value is less than the second timing advance value, and wherein the indication omits the 1-bit value when the first timing advance value is the same as the second timing advance value, wherein the first timing advance value is within a first time period and the second timing advance value is within a second time period, wherein the first time period is later in time than the second time period for which the communication device transmitted another timing advance report that included the second timing advance value, wherein the another timing advance report is transmitted prior to the timing advance report, wherein the relative value indicates a direction of change of the first timing advance value in the timing advance report compared to the second timing advance value in the another timing advance report.

2. The method of claim 1, wherein the trigger condition indicates that the at least one timing advance value is transmitted in response to the at least one timing advance value being above a threshold value.

3. The method of claim 1, wherein the trigger condition indicates that the at least one timing advance value is transmitted in response to the at least one timing advance value associated with a corresponding segment being different from another timing advance value associated with another segment, and wherein the another segment is located prior to the corresponding segment in time domain.

4. The method of claim 1, wherein the trigger condition indicates that the transmitting the at least one timing advance value includes transmitting a largest timing advance value from a plurality of timing advance values, wherein the trigger condition indicates that the largest timing advance value from a plurality of timing advance values is transmitted in response to the largest timing advance value associated with a corresponding segment being different than another timing advance value associated with another segment, and wherein the another segment is located prior to the corresponding segment in time domain.

5. The method of claim 1, wherein the at least one timing advance value correspond to at least one segment in the time period, and wherein the trigger condition specifies that the transmitting the at least one timing advance value includes transmitting each timing advance value of each of a plurality of segments.

6. A wireless communication method, comprising:

receiving, by a network device, at least one timing advance value associated with a time period, wherein the at least one timing advance value is received based on a trigger condition, wherein the time period corresponds to a reception duration of a message for a shared channel or a random access channel, wherein the receiving includes receiving a timing advance report that includes an indication that indicates a relative value of a first timing advance value compared to a second timing advance value, wherein the indication includes a 1-bit value included in the timing advance report that indicates when (1) the first timing advance value is greater than the second timing advance value, or (2) the first timing advance value is less than the second timing advance value, and wherein the indication omits the 1-bit value when the first timing advance value is the same as the second timing advance value, wherein the first timing advance value is within a first time period and the second timing advance value is within a second time period, wherein the first time period is later in time than the second time period for which the network device received another timing advance report that included the second timing advance value, wherein the another timing advance report is received prior to the timing advance report, wherein the relative value indicates a direction of change of the first timing advance value in the timing advance report compared to the second timing advance value in the another timing advance report.

7. The method of claim 6, wherein the trigger condition indicates that the at least one timing advance value is received in response to the at least one timing advance value being above a threshold value.

8. The method of claim 6, wherein the trigger condition indicates that the at least one timing advance value is received in response to the at least one timing advance value associated with a corresponding segment being different from another timing advance value associated with another segment, and wherein the another segment is located prior to the corresponding segment in time domain.

9. The method of claim 6, wherein the trigger condition indicates that receiving the at least one timing advance value include receiving a largest timing advance value from a plurality of timing advance values, wherein the trigger condition indicates that the largest timing advance value from a plurality of timing advance values is received in response to the largest timing advance value associated with a corresponding segment being different than another timing advance value associated with another segment, and wherein the another segment is located prior to the corresponding segment in time domain.

10. The method of claim 6, wherein the at least one timing advance value correspond to a least one segment in the time period, and wherein the trigger condition specifies that the receiving the at least one timing advance value includes receiving each timing advance value of each of a plurality of segments.

11. An apparatus for wireless communication comprising a processor, configured to implement a method, the processor configured to:

transmit, by a communication device, at least one timing advance value associated with a time period, wherein the at least one timing advance value is transmitted based on a trigger condition, wherein the time period corresponds to a transmission duration of a message for a shared channel or a random access channel, wherein the transmitting includes transmitting a timing advance report that includes an indication that indicates a relative value of a first timing advance value compared to a second timing advance value, wherein the indication includes a 1-bit value included in the timing advance report that indicates when (1) the first timing advance value is greater than the second timing advance value, or (2) the first timing advance value is less than the second timing advance value, and wherein the indication omits the 1-bit value when the first timing advance value is the same as the second timing advance value, wherein the first timing advance value is within a first time period and the second timing advance value is within a second time period, wherein the first time period is later in time than the second time period for which the communication device transmitted another timing advance report that included the second timing advance value, wherein the another timing advance report is transmitted prior to the timing advance report, wherein the relative value indicates a direction of change of the first timing advance value in the timing advance report compared to the second timing advance value in the another timing advance report.

12. The apparatus of claim 11, wherein the trigger condition indicates that the at least one timing advance value is transmitted in response to the at least one timing advance value being above a threshold value.

13. The apparatus of claim 11, wherein the trigger condition indicates that the at least one timing advance value is transmitted in response to the at least one timing advance value associated with a corresponding segment being different from another timing advance value associated with another segment, and wherein the another segment is located prior to the corresponding segment in time domain.

14. The apparatus of claim 11, wherein the trigger condition indicates that the transmitting the at least one timing advance value includes transmitting a largest timing advance value from a plurality of timing advance values, wherein the trigger condition indicates that the largest timing advance value from a plurality of timing advance values is transmitted in response to the largest timing advance value associated with a corresponding segment being different than another timing advance value associated with another segment, and wherein the another segment is located prior to the corresponding segment in time domain.

15. An apparatus for wireless communication comprising at least one processor, configured to implement a method, the at least one processor configured to:

receive, by a network device, at least one timing advance value associated with a time period, wherein the at least one timing advance value is received based on a trigger condition, wherein the time period corresponds to a reception duration of a message for a shared channel or a random access channel, wherein the receiving includes receiving a timing advance report that includes an indication that indicates a relative value of a first timing advance value compared to a second timing advance value, wherein the indication includes a 1-bit value included in the timing advance report that indicates when (1) the first timing advance value is greater than the second timing advance value, or (2) the first timing advance value is less than the second timing advance value, and wherein the indication omits the 1-bit value when the first timing advance value is the same as the second timing advance value, wherein the first timing advance value is within a first time period and the second timing advance value is within a second time period, wherein the first time period is later in time than the second time period for which the network device received another timing advance report that included the second timing advance value, wherein the another timing advance report is received prior to the timing advance report, wherein the relative value indicates a direction of change of the first timing advance value in the timing advance report compared to the second timing advance value in the another timing advance report.

16. The apparatus of claim 15, wherein the trigger condition indicates that the at least one timing advance value is received in response to the at least one timing advance value being above a threshold value.

17. The apparatus of claim 15, wherein the trigger condition indicates that the at least one timing advance value is received in response to the at least one timing advance value associated with a corresponding segment being different from another timing advance value associated with another segment, and wherein the another segment is located prior to the corresponding segment in time domain.

18. The apparatus of claim 15, wherein the trigger condition indicates that receiving the at least one timing advance value include receiving a largest timing advance value from a plurality of timing advance values, wherein the trigger condition indicates that the largest timing advance value from a plurality of timing advance values is received in response to the largest timing advance value associated with a corresponding segment being different than another timing advance value associated with another segment, and wherein the another segment is located prior to the corresponding segment in time domain.

* * * * *